(12) United States Patent
Tsukahara et al.

(10) Patent No.: US 9,779,700 B2
(45) Date of Patent: Oct. 3, 2017

(54) HEAD-MOUNTED DISPLAY AND INFORMATION DISPLAY APPARATUS

(71) Applicant: Sony Corporation, Tokyo (JP)

(72) Inventors: Tsubasa Tsukahara, Tokyo (JP); Masatoshi Ueno, Kanagawa (JP); Kenichi Kabasawa, Saitama (JP); Shinobu Kuriya, Kanagawa (JP); Tetsuro Goto, Tokyo (JP); Hisako Sugano, Kanagawa (JP); Daisuke Kawakami, Kanagawa (JP); Toshiyuki Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/367,030

(22) PCT Filed: Nov. 2, 2012

(86) PCT No.: PCT/JP2012/007032
§ 371 (c)(1),
(2) Date: Jun. 19, 2014

(87) PCT Pub. No.: WO2013/099081
PCT Pub. Date: Jul. 4, 2013

(65) Prior Publication Data
US 2015/0002434 A1 Jan. 1, 2015

(30) Foreign Application Priority Data

Dec. 26, 2011 (JP) .................................. 2011-282869

(51) Int. Cl.
*G06F 3/0488* (2013.01)
*G09G 5/377* (2006.01)
(Continued)

(52) U.S. Cl.
CPC ........... *G09G 5/377* (2013.01); *G02B 27/017* (2013.01); *G06F 3/011* (2013.01); *G06F 3/0416* (2013.01);
(Continued)

(58) Field of Classification Search
None
See application file for complete search history.

(56) References Cited

U.S. PATENT DOCUMENTS

2004/0027312 A1* 2/2004 Owada .................. G06F 1/1626
345/8
2008/0204427 A1* 8/2008 Heesemans et al. ......... 345/174
(Continued)

FOREIGN PATENT DOCUMENTS

JP 06-202776 7/1994
JP 2008-070817 3/2008
(Continued)

*Primary Examiner* — Seokyun Moon
(74) *Attorney, Agent, or Firm* — K&L Gates LLP

(57) ABSTRACT

To provide a head-mounted display and an information display apparatus that match the intuition of the user and are excellent in operability. A head-mounted display according to an embodiment of the present technology includes a reception unit, an image display element, and a display processing unit. The reception unit receives an operation signal including information on a relative position of a detection target in contact with an input operation surface, which is output from the input device. The image display element forms an image V1 presented to a user. The display processing unit causes, based on the operation signal, the image display element to display an operation image V10 with an auxiliary image P indicating a position of the detection target being overlapped on the image V1.

9 Claims, 15 Drawing Sheets

(51) Int. Cl.
*G06F 3/01* (2006.01)
*G06F 3/0485* (2013.01)
*G02B 27/01* (2006.01)
*G06F 3/041* (2006.01)
*G09G 3/00* (2006.01)

(52) U.S. Cl.
CPC .......... *G06F 3/0485* (2013.01); *G06F 3/0488* (2013.01); *G02B 2027/014* (2013.01); *G02B 2027/0178* (2013.01); *G02B 2027/0187* (2013.01); *G06F 2203/04101* (2013.01); *G06F 2203/04801* (2013.01); *G06F 2203/04806* (2013.01); *G06F 2203/04808* (2013.01); *G09G 3/003* (2013.01)

(56) References Cited

U.S. PATENT DOCUMENTS

| | | | |
|---|---|---|---|
| 2008/0273015 A1* | 11/2008 | Huang et al. | 345/173 |
| 2010/0114974 A1* | 5/2010 | Jung | G06F 3/016 707/802 |
| 2010/0153879 A1* | 6/2010 | Rimas-Ribikauskas | G06F 3/0488 715/810 |
| 2012/0293449 A1* | 11/2012 | Dietz | G06F 3/045 345/174 |

FOREIGN PATENT DOCUMENTS

| | | |
|---|---|---|
| JP | 2009-042967 | 2/2009 |
| JP | 2010-145861 | 7/2010 |

* cited by examiner (A)

(B)

(A)

(B)

(A)

(B)

HEAD-MOUNTED DISPLAY AND INFORMATION DISPLAY APPARATUS

CROSS REFERENCES TO RELATED APPLICATIONS

The present application is a national stage of International Application No. PCT/JP2012/007032 filed on Nov. 2, 2012 and claims priority to Japanese Patent Application No. 2011-282869 filed on Dec. 26, 2011, the disclosure of which is incorporated herein by reference.

BACKGROUND

The present technology relates to a head-mounted display and an information display apparatus.

There is known a head-mounted display (HMD) that is mounted on a head of a user and capable of presenting an image to the user through a display or the like placed in front of eyes. The HMDs are classified into a non-see-through HMD that does not allow external light to pass therethrough and displays only a predetermined image to the user and into a see-through HMD that allows the user to view an outside world and displays, for example, a predetermined image overlapping with a field of view of the user. For example, Patent Document 1 describes a non-see-through HMD including a main body provided with an operation input unit such as a button.

On the other hand, in recent years, for a method of performing an input into the information processing apparatus or the like, a touch panel method in which indicated items (GUIs: Graphical User Interfaces) are switched such that the multiple GUIs can be presented to the user instead of the button or the like having a large occupation area, which imposes a limitation on diversification, is becoming a mainstream. In view of this, Patent Document 2 describes a see-through HMD with an input operation surface of a touch panel being placed in a field-of-view area of the user for performing an input operation.

Patent Document 1: Japanese Patent Application Laid-open No. 2008-070817
Patent Document 2: Japanese Patent Application Laid-open No. 2010-145861

SUMMARY

Problem to be Solved by the Invention

However, in the see-through HMD described in Patent Document 2, it is necessary to place and use the input operation surface of the touch panel in the field-of-view area via the HMD. Therefore, contradiction between an input operation and an image display is likely to occur and there is a problem in operability.

In view of the above-mentioned circumstances, it is an object of the present technology to provide a head-mounted display and an information display apparatus that match the intuition of the user and are excellent in operability.

Means for Solving the Problem

In order to achieve the above-mentioned object, a head-mounted display according to an embodiment of the present technology includes a reception unit, an image display element, and a display processing unit.

The reception unit receives an operation signal including information on a relative position of a detection target in contact with an input operation surface, which is output from an input device.

The image display element forms an image presented to a user.

The display processing unit causes, based on the operation signal, the image display element to display an operation image with an auxiliary image indicating a position of the detection target being overlapped on the image.

By wearing the head-mounted display (HMD), the user can view the information on the relative position of the detection target such as a finger in contact with the input operation surface as the auxiliary image in the operation image presented by the HMD. This enables the user to perform an intuitive operation while viewing the operation image by the HMD without needing to check the input operation surface.

In the head-mounted display, the reception unit may further receive an image signal output from the input device, and the display processing unit may cause, based on the image signal, the image display element to display the image.

The HMD having such a configuration can use not only a dedicated input device but also, for example, a portable terminal or the like installing a touch panel as the input device. This makes it possible to use a variety of applications of the portable terminal or the like through the HMD.

The display processing unit may move, based on the operation signal, the auxiliary image in a display area of the image.

This enables the user to check the relative position of the detection target in contact with the input operation surface over time, using the operation image. Thus, it is possible to further enhance the operability.

Further, the operation signal may include information on a contact pressure of the detection target against the input operation surface, and the display processing unit may change a display mode of the auxiliary image depending on the contact pressure of the detection target against the input operation surface.

This enables the HMD to reflect the "push-in" operation by the user on the input operation surface, for example, to the operation image. Thus, the user can perform a wide variety of operations combining the contact with the input operation surface and the "pushing-in."

The head-mounted display may further include an arithmetic unit that calculates, based on the operation signal, a coordinate position of the detection target on the input operation surface, in which the display processing unit causes, based on a coordinate position of the detection target calculated by the arithmetic unit, the image display element to display the operation image.

The head-mounted display can process a signal detected from the input device. Thus, it is possible to use even an input device having a simple apparatus configuration.

In order to achieve the above-mentioned object, an information display apparatus according to an embodiment of the present technology includes an input device and a head-mounted display.

The input device includes an input operation surface, and a sensor unit that detects a contact of a detection target with the input operation surface and outputs information on a coordinate position of the detection target on the input operation surface.

The head-mounted display includes an image display element that forms an image presented to a user, and a display processing unit that causes, based on an output of the sensor unit, the image display element to form an operation image with an auxiliary image indicating a position of the detection target being overlapped on the image.

The information display apparatus can present to the user the image based on the input operation into the input device through the head-mounted display. Thus, the user can perform an intuitive operation without needing to check the input operation surface.

The sensor unit may detect a contact pressure added by the detection target to the input operation surface.

In addition, at this time, the head-mounted display may change a display mode of the auxiliary image depending on the contact pressure of the detection target from the operation surface.

The input device can detect the contact pressure (push-in force) of the detection target against the input operation surface. Thus, this information can be reflected to the operation image by the HMD. This enables the user to perform a greater variety of operations.

Further, the sensor unit may detect a movement of the detection target on the input operation surface, and the head-mounted display may display the auxiliary image moving depending on the detected movement of the detection target.

The input device may further include a display element that displays an image on the input operation surface, and the head-mounted display may display an image with the auxiliary image being overlapped on an image displayed on the input operation surface, as the operation image.

In order to achieve the above-mentioned object, the information display apparatus according to an embodiment of the present technology includes an input device and a head-mounted display.

The input device includes an input operation surface, and a sensor unit that detects a contact of the detection target with the input operation surface.

The head-mounted display includes an image display element that forms an image presented to a user, an arithmetic unit that calculates, based on an output of the sensor unit, a coordinate position of the detection target on the input operation surface, and a display processing unit that causes, based on a coordinate position of the detection target calculated by the arithmetic unit, the image display element to form an operation image with an auxiliary image indicating a position of the detection target being overlapped on the image.

With the information display apparatus, the configuration of the input device can be simplified. This makes it possible to realize a reduction in weight or the like of the input device and to provide an information display apparatus that causes less fatigue even in long-term operation.

Effect of the Invention

As described above, according to the present technology, it is possible to provide a head-mounted display and an information display apparatus that match the intuition of the user and are excellent in operability.

Additional features and advantages are described herein, and will be apparent from the following Detailed Description and the figures.

MODE(S) FOR CARRYING OUT THE INVENTION

Hereinafter, embodiments according to the present technology will be described with reference to the drawings.

Detailed Description

Figure 1:
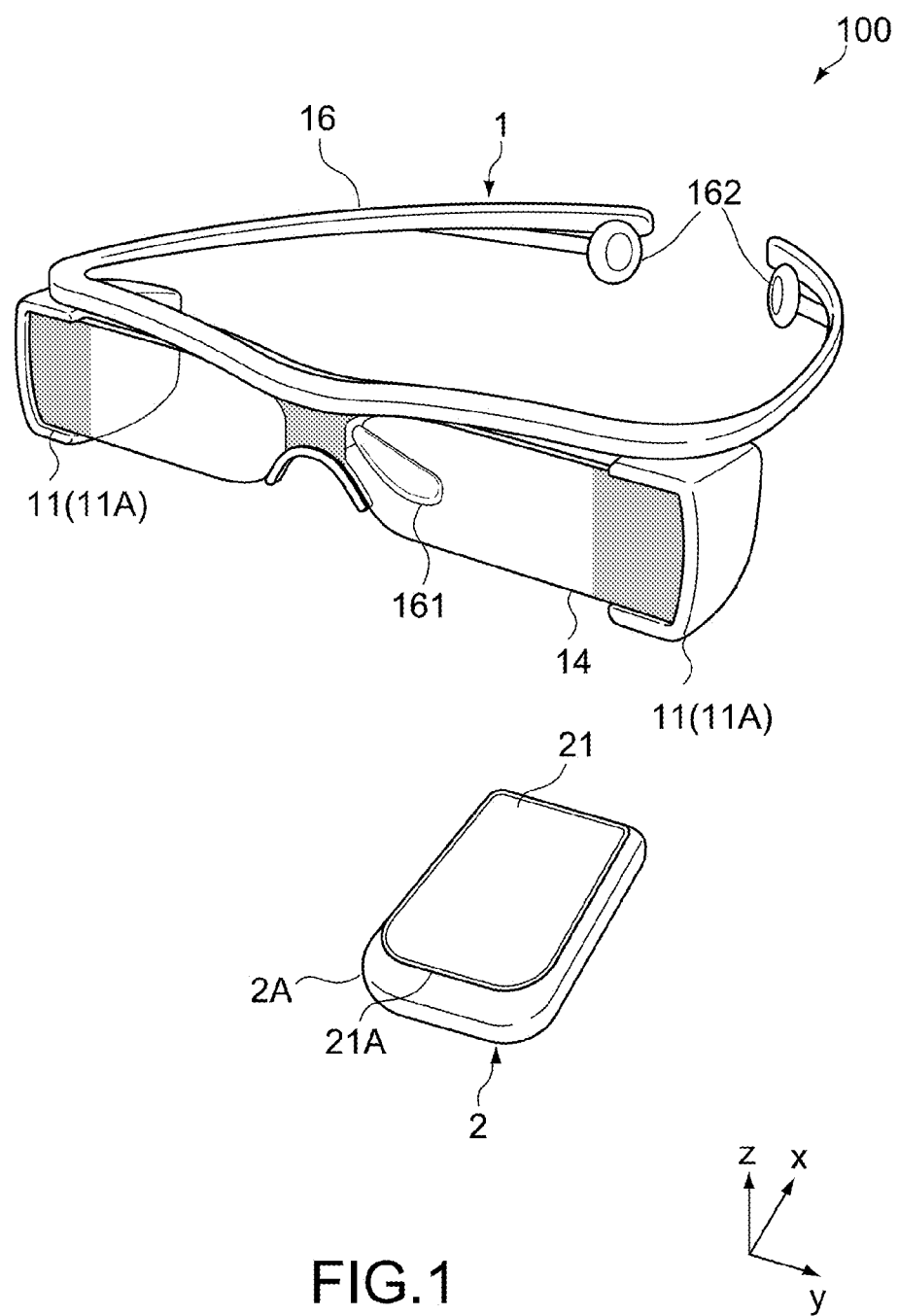
FIG. 1 A schematic perspective view showing an information processing apparatus according to a first embodiment of the present technology.

<First Embodiment>
[Information Display Apparatus]
FIG. 1 is a schematic perspective view showing an information display apparatus according to an embodiment of the present technology. An information display apparatus 100 according to this embodiment includes a head-mounted display (HMD) 1 and an input device 2.

The HMD 1 is configured as a see-through HMD in this embodiment. The HMD 1 has an eyeglass-shape as a whole. While a user putting the HMD 1 on the head is viewing an outside world, the HMD 1 is configured to be capable of presenting to the user an image based on information output from the input device 2.

The input device 2 is connected to be wirelessly communicable with the HMD 1. Alternatively, the input device 2 may be configured to be communicable with the HMD 1 in a wired manner via a cable or the like. In this embodiment, the input device 2 is constituted of a portable terminal with a touch panel, for example. The input device 2 can be connected also to the Internet and the like. Further, the input device 2 may function as a so-called remote controller for the HMD 1 and be configured to be capable of performing input operations for various settings or the like of the HMD 1.

Next, the input device 2 and the HMD 1 will be described.
[Input Device]
The input device 2 includes a casing 2A having such a size that the user can hold, for example. The casing 2A is an almost-rectangular parallelepiped having a longitudinal direction in an x-axis direction, a lateral direction in a y-axis direction, a thickness direction in the z-axis direction. An input operation surface 21 is formed in one surface of the casing 2A. The input operation surface 21 belongs to a two-dimensional coordinate system having coordinate axes in an x-axis and a y-axis orthogonal thereto. The input operation surface 21 has a rectangular shape perpendicular to a z-axis, which includes long sides parallel to the x-axis direction and short sides parallel to the y-axis direction.

For example, the input device 2 has a function of detecting, with a finger(s) of the user being a detection target, an xy-coordinate position of the finger on the input operation surface 21 and a change thereof. The input device 2 further has a function of detecting an amount of deformation in the z-axis direction of the input operation surface 21 by the finger, that is, a contact pressure. With this, the contact pressure of the finger in the z-axis direction against the input operation surface 21 is acquired together with a movement direction, a movement speed, an amount of movement, and the like of the finger on the input operation surface 21. Note that the detection target is not limited to the finger of the user, and may be a stylus or the like.

In this embodiment, the input operation surface 21 is constituted of a light-transmissive display cover or the like. An input operation by the detection target is performed on the input operation surface 21. The input operation surface 21 also functions as a screen for displaying an image. The input operation surface 21 is, for example, provided to cover an opening 21A formed in a surface of the casing 2A and fixed to the casing 2A at a periphery thereof. Further, the material, the thickness, the size, and the like of the input operation surface 21 are set such that the input operation surface 21 can be deformed due to a predetermined contact pressure or higher. For example, a transparent plastic plate made of acrylic resin, polycarbonate resin, or PET (polyethylene terephthalate), a glass plate, or a ceramic plate is employed for the material of the input operation surface 21.

Figure 2:
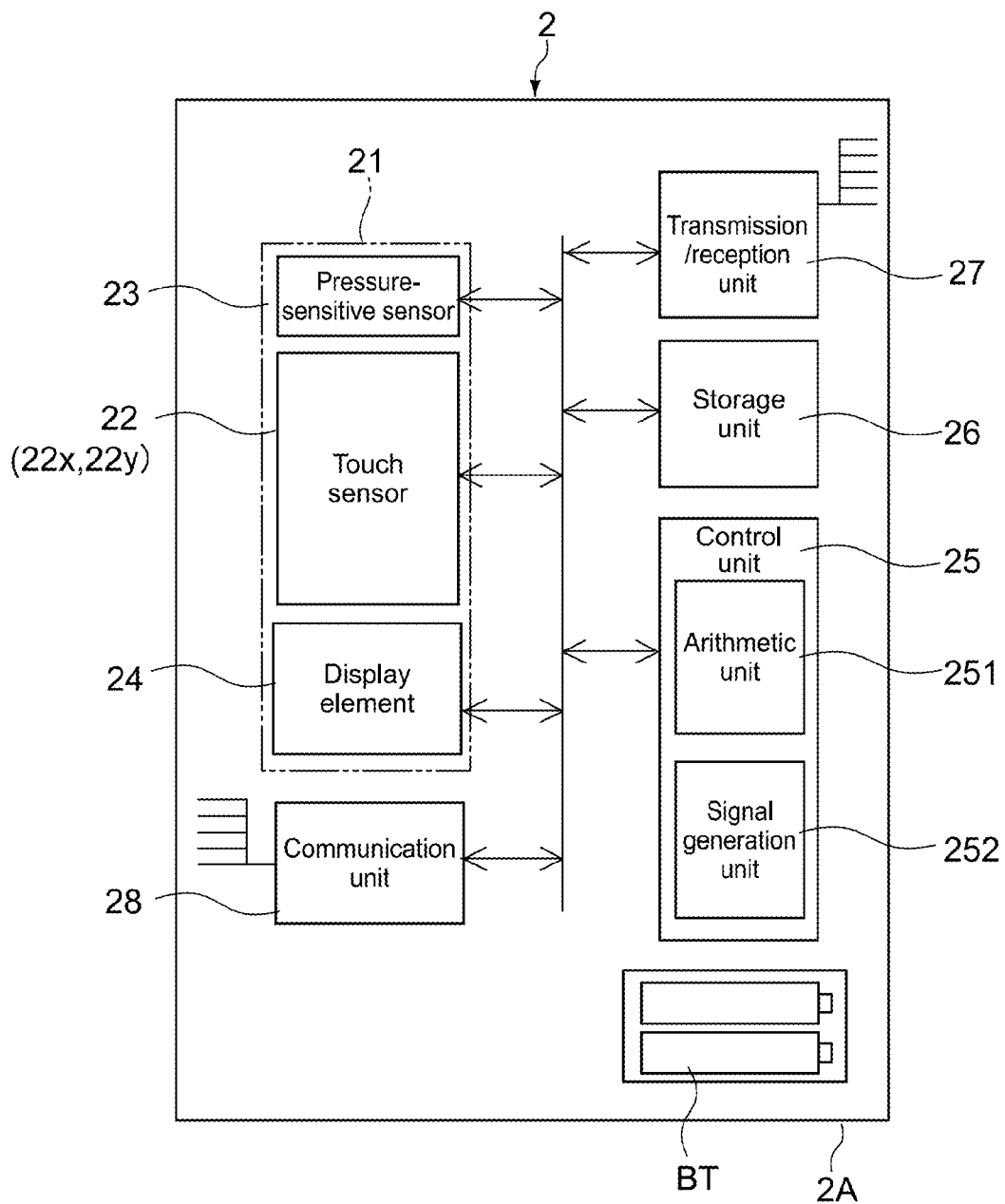
FIG. 2 A block diagram showing an internal configuration of an input device according to the first embodiment of the present technology.

FIG. 2 is a block diagram showing an internal configuration of the input device 2. The input device 2 includes a casing 2A, an input operation surface 21, a touch sensor 22, a pressure-sensitive sensor 23, a display element 24, a control unit 25, a storage unit 26, a transmission/reception unit 27, a communication unit 28, and a battery BT. The touch sensor 22 and the pressure-sensitive sensor 23 constitute a "sensor unit" in this embodiment.

The touch sensor 22 has a panel shape with a size almost identical to the input operation surface 21. The touch sensor 22 is provided directly below the input operation surface 21 and detects a detection target (finger) in contact with the input operation surface 21. The touch sensor 22 detects a coordinate position corresponding to a movement in an xy-plane of the detection target on the input operation surface 21 and outputs a detection signal corresponding to the coordinate position.

In this embodiment, a capacitance touch panel capable of capacitively detecting the detection target in contact with the input operation surface 21 is used as the touch sensor 22. The capacitance touch panel may be a projected capacitive type (projection type) or may be a surface capacitive type (surface type). The touch sensor 22 of this type typically includes a first sensor $22x$ for x-position detection in which a plurality of first wires parallel to the y-axis direction are arranged in the x-axis direction and a second sensor $22y$ for position detection in which a plurality of second wires parallel to the x-axis direction are arranged in the y-axis direction. The first and second sensors $22x$ and $22y$ are arranged to be opposed to each other in the z-axis direction. Regarding the touch sensor 22, signal electric current is sequentially supplied by a driving circuit of the control unit 25 to be described later to the first and second wires, for example.

Other than the above, the touch sensor 22 is not particularly limited as long as it is a sensor capable of detecting the coordinate position of the detection target, various types such as resistive type, an infrared type, an ultrasonic type, a surface acoustic wave type, an acoustic pulse recognition type, and an infrared image sensor are applicable.

In this embodiment, a pressure-sensitive sensor capable of capacitively detecting the contact pressure of the detection target in a Z-axis direction of the input operation surface 21 is used as the pressure-sensitive sensor 23. The pressure-sensitive sensor 23 includes, for example, a pair of electrodes or more that are arranged between the input operation surface 21 and the casing 2A and opposed in the z-axis direction, and detects a contact pressure due to a change in capacitance between the electrodes that is caused by deformation of the input operation surface 21. Alternatively, one including an elastic body between the pair of electrodes may be employed as the pressure-sensitive sensor 23. In this case, the contact pressure is detected due to a change in capacitance between the electrodes that is caused by an elastic deformation of the elastic body due to a pushing operation on the input operation surface 21. Note that the pressure-sensitive sensor 23 can be driven by the driving circuit of the control unit 25 to be described later, for example.

The pressure-sensitive sensor 23 is not limited to the above-mentioned configuration. For example, a piezoelectric sensor using a piezoelectric element or a strain gauge may also be used.

The display element 24 is provided directly below the input operation surface 21 and the touch sensor 22. The display element 24 in this embodiment is not particularly limited and a liquid-crystal display or an organic EL display can be used. This enables an image of a character, a picture, or the like to be displayed on the input operation surface 21.

The control unit 25 is, typically, constituted of a CPU (Central Processing Unit) or an MPU (Micro-Processing Unit). In this embodiment, the control unit 25 includes an arithmetic unit 251 and a signal generation unit 252 and executes various functions according to programs stored in the storage unit 26. The arithmetic unit 251 executes predetermined arithmetic processing on electrical signals output from the touch sensor 22 and the pressure-sensitive sensor 23 and generates an operation signal including information on a relative position of the detection target in contact with the input operation surface 21. The signal generation unit 252 generates, based on the arithmetic results, an image signal for causing the display element 24 to display an image. The control unit 25 includes the driving circuit for driving the touch sensor 22 and the driving circuit is, in this embodiment, incorporated in the arithmetic unit 251.

Specifically, the arithmetic unit 251 calculates, based on signals output from the touch sensor 22 and the pressure-sensitive sensor 23, the xy-coordinate position and the contact pressure of the finger on the input operation surface 21. In addition, for example, when it is detected based on the calculation result that the detection target is located at a predetermined xy-coordinate position and a contact pressure equal to or larger than a predetermined threshold is further detected at this coordinate position, the arithmetic unit 251 executes predetermined processing assigned to a GUI corresponding to this coordinate position. The processing results by the arithmetic unit 251 are transmitted to the signal generation unit 252.

The signal generation unit 252 generates, based on the processing results transmitted from the arithmetic unit 251, an image signal for forming an image to be displayed by the display element 24. At this time, the signal generation unit 252 is also capable of generating a signal for displaying an auxiliary image such as a pointer and an area changed in luminance or intensity at a position corresponding to the xy-coordinate position of the detection target of the image on the input operation surface 21. Further, the signal generation unit 252 is also capable of generating a signal for changing a display mode of the auxiliary image depending on the contact pressure of the detection target.

The operation signal relating to the xy-coordinate position and the contact pressure calculated by the arithmetic unit 251 of the control unit 25 and the image signal generated by the signal generation unit 252 are configured to be transmitted to the HMD 1 via the transmission/reception unit 27. Although not shown in the figures, the input device 2 includes an A/D converter that converts the detection signals (analog signals) output from the touch sensor 22 and the pressure-sensitive sensor 23 into digital signals and a D/A converter that converts the digital signals into the analog signals.

The storage unit 26 is constituted of a RAM (Random Access Memory), a ROM (Read Only Memory), other semiconductor memory, and the like and stores programs or the like used in various calculations by the control unit 25. For example, the ROM is constituted of a non-volatile memory and stores programs and setting values for causing the control unit 25 to execute arithmetic processing such as calculation of the xy-coordinate position and the contact pressure. Further, the storage unit 26 can store the xy-coordinate position and the contact pressure of the detection target, and programs or the like for executing functions assigned corresponding to them, for example, with a non-volatile semiconductor memory. In addition, the programs stored in the semiconductor memory or the like in advance may be loaded into the RAM and executed by the arithmetic unit 251 of the control unit 25.

The transmission/reception unit 27 is configured to be capable of wirelessly transmitting various control signals generated by the control unit 25 to the HMD 1, for example. The transmission/reception unit 27 is further configured to be capable of receiving a predetermined signal transmitted from the HMD 2. On the other hand, the communication unit 28 is connected to a communication network such as the Internet. The communication unit 28 is used in downloading a predetermined program, for example, an application into the input device 2. The transmission and reception in the communication unit 28 may be wired via a LAN cable or the like or may be wireless, for example, as a high-speed data communication.

The battery BT constitutes a power-supply for the input device 2 and supplies a necessary electrical power to the respective units inside the casing 2A. The battery BT may be a primary battery or may be a secondary battery. Alternatively, the battery BT may be constituted of a solar cell. In addition, the input device 2 may also include an external switch (not shown) for controlling the actuation or the like of the input device 2 when pressed.

[HMD]

The HMD 1 is the see-through HMD and configured to be capable of presenting a predetermined image in a field-of-view area while allowing the user to view an outside world. The HMD 1 according to this embodiment includes an image display apparatus 11 and a support unit 16. The HMD 1 has an eyeglass-shape as a whole. For example, by employing a see-through HMD as the HMD 1, it becomes possible to view the outside world even when the input device 2 is being operated. Thus, the safety during operation can be enhanced.

The support unit 16 can be mounted on the head of the user. Upon mounting, an image display element 14 to be described later is configured to be supported in front of the eyes of the user. Although the shape of the support unit 16 is not particularly limited, the support unit 16 can be in an eyeglass-shape as a whole in this embodiment. The support unit 16 has a temple-like structure that can be mounted on left and right ears of the user, for example. A nose pad 161 can be also attached near to a nose bridge of the support unit 16. Further, the support unit 16 may be equipped with earphones 162. For example, metal, alloy, or plastic may be employed for the material of the support unit 16, and not particularly limited.

The image display apparatus 11 includes a casing 11A and is, for example, located at a predetermined position of the support unit 16. The position of the image display apparatus 11 is not particularly limited. For example, the image display apparatus 11 is located outside the left and right eyes of the user such that the casing 11A is not included in the field-of-view area of the user.

Figure 3:
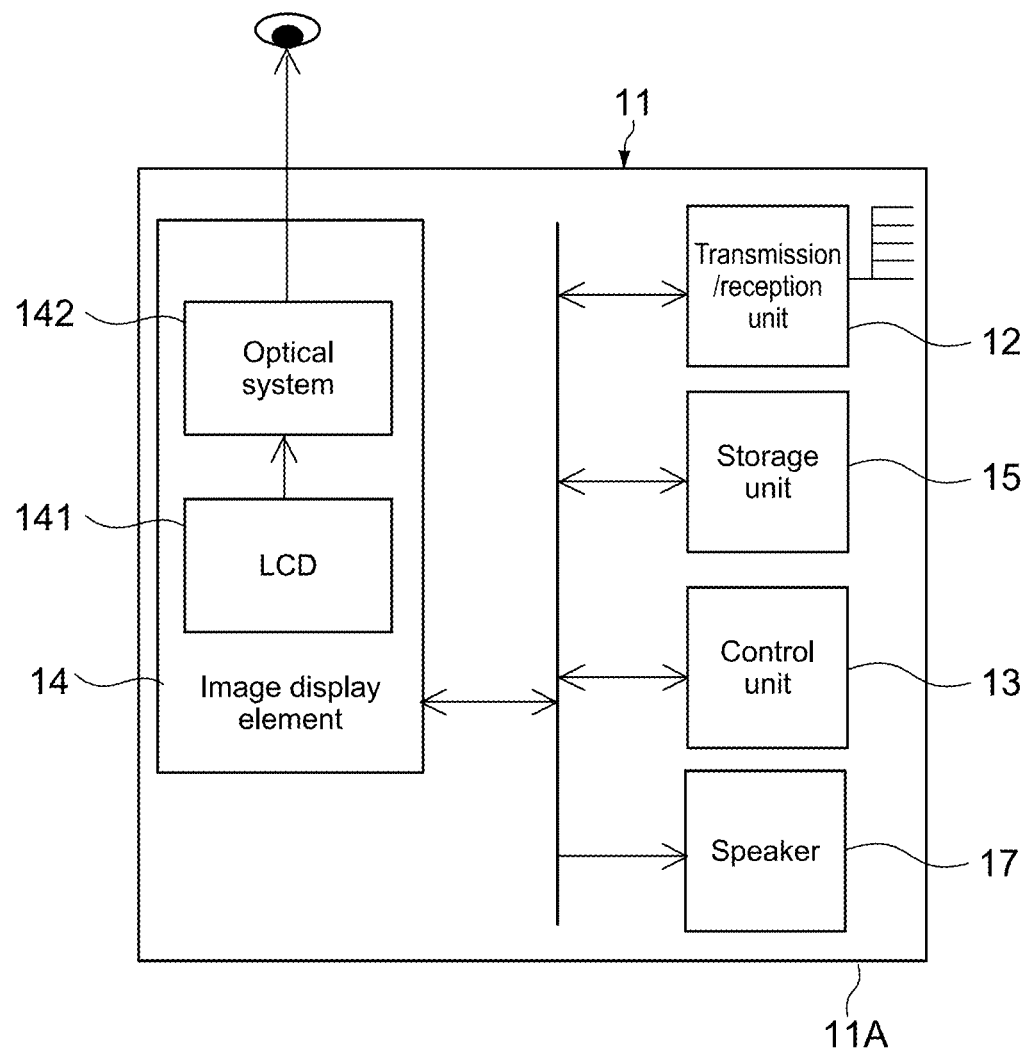
FIG. 3 A block diagram showing an internal configuration of a head-mounted display (HMD) according to the first embodiment of the present technology.

FIG. 3 is a block diagram showing an internal configuration of the image display apparatus 11. In this embodiment, the image display apparatus 11 includes the casing 11A, a transmission and reception unit (reception unit) 12, a control unit 13, the image display element 14, and a storage unit 15. In this embodiment, the control unit 13 constitutes a "display processing unit."

The transmission and reception unit 12 receives an operation signal that is output from the transmission/reception unit 27 of the input device 2 and includes information on the xy-coordinate position and the contact pressure of the detection target in contact with the input operation surface 21. In addition, the image signal of the image displayed on the input operation surface 21 of the input device 2 may also be received. A method of transmitting the signal is not particularly limited. For example, as the wireless communication, a communication between apparatuses such as "Wi Fi" (registered trademark), "ZigBee" (registered trademark), and "Bluetooth" (registered trademark) or a communication over the Internet can be used. Alternatively, it may be wired one via a USB (Universal Serial Bus), an HDMI (High-Definition Multimedia Interface), or the like.

The control unit 13 is typically constituted of the CPU or the MPU and executes various functions according to programs stored in the storage unit 15. In this embodiment, the control unit 13 generates, based on the operation signal and the image signal received by the transmission and reception unit 12, a control signal for causing the image display element 14 to form an image presented to the user. For example, this enables the image display element 14 to display an operation image with an auxiliary image indicating the position of the detection target being overlapped on the same image as the image displayed on the input operation surface 21. The shape of the auxiliary image is not particularly limited. For example, the auxiliary image is constituted of an annular (ring-like) pointer, an area changed in luminance or intensity, or the like.

In this embodiment, the image display element 14 includes a liquid-crystal display (LCD) element 141 and an optical system 142. The image display element 14 is configured to present an image formed by the LCD 141 to the user via the optical system 142.

In the LCD 141, a plurality of pixels are arranged in a matrix form. The LCD 141 modulates light input from a light source (not shown) formed of an LED (light-emitting diode) or the like for each pixel according to a control signal generated by the control unit 13. The LCD 141 outputs light for forming an image presented to the user. The LCD 141 may use, for example, a single-plate method of outputting image light beams corresponding to the colors of R (red), G (green), and B (blue) at the same time or a three-plate method of individually outputting the image light beams corresponding to the colors.

The optical system 142 is configured to be capable of deflecting light emitted from the LCD 141 to be guided to the eyes of the user. The optical system 142 may be constituted of, for example, a light guide plate formed of a transparent substrate capable of guiding light due to a total reflection and a reflective volume hologram diffraction grating capable of performing a diffraction reflection. For example, the light guide plate is formed in a rectangular or circular plate-shape or the like and is placed in front of the eyes of the user like lenses of eyeglasses. The hologram diffraction grating or the like is appropriately provided in the light guide plate and manufactured to be capable of reflecting light emitted from the LCD 141 to be guided to the eyes of the user. In addition to the hologram diffraction grating, for example, a reflection plate or the like may be employed.

The optical system 142 having such a configuration is capable of presenting the operation image in the field-of-view area of the user because light emitted from the LCD 141 is reflected at a predetermined position. Further, the light guide plate is formed of a transparent substrate, and hence it is possible to present the operation image in the field-of-view area in an overlapping manner while allowing the user to view the outside world.

The storage unit 15 is constituted of the RAM, the ROM, the other semiconductor memory, and the like and stores programs or the like used for various calculations by the control unit 13

A speaker 17 converts an electrical audio signal, which is transmitted by the input device 2 and generated by the control unit 13 or the like, into a physical vibration and provides the user with sounds via the earphones 162. Note that the configuration of the speaker 17 is not particularly limited.

Note that the image display apparatus 11 is not limited to a configuration in which two image display apparatuses 11 are provided corresponding to both the eyes. For example, a configuration in which one image display apparatus 11 is provided corresponding to only one of the left and right eyes is also possible.

[Operation Example of Information Display Apparatus]

Next, a basic operation example of an information display apparatus 100 will be described.

Figure 4:
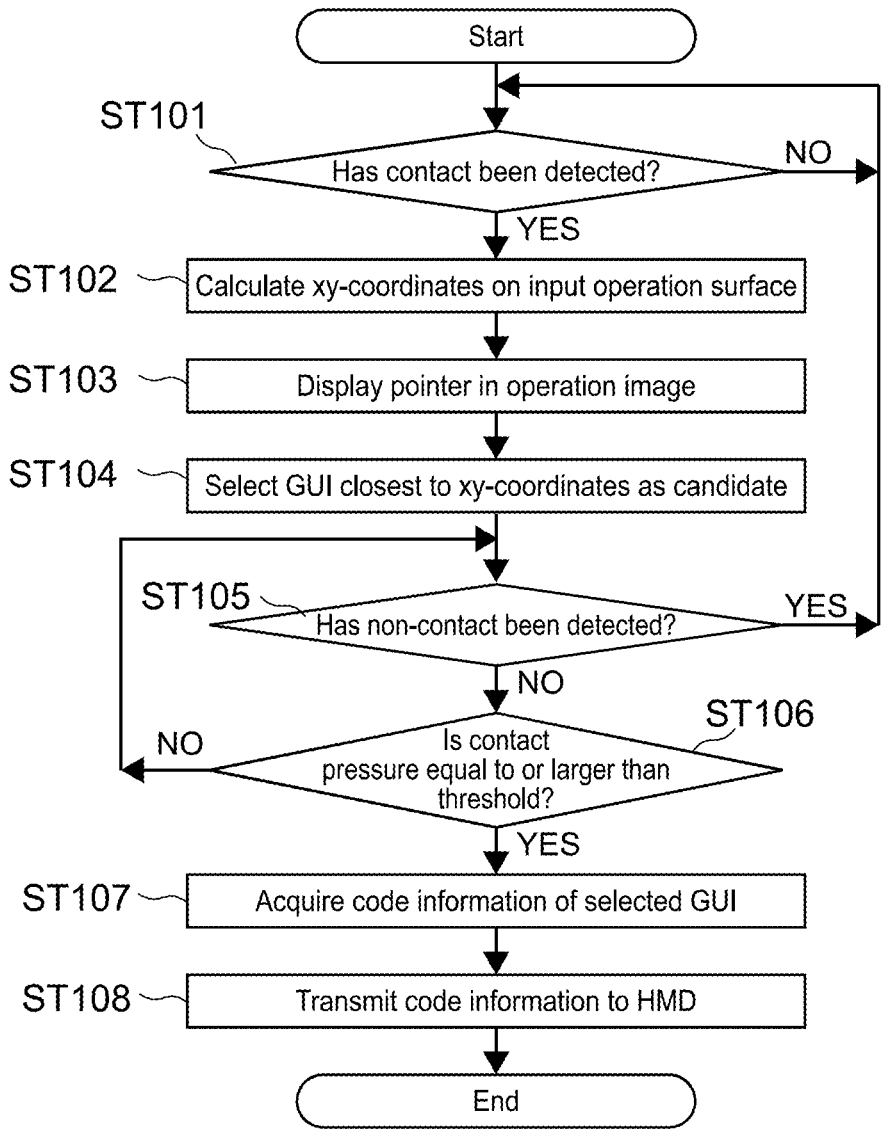
FIG. 4 A flowchart in an operation example of the information processing apparatus according to the first embodiment of the present technology.
Figure 5:
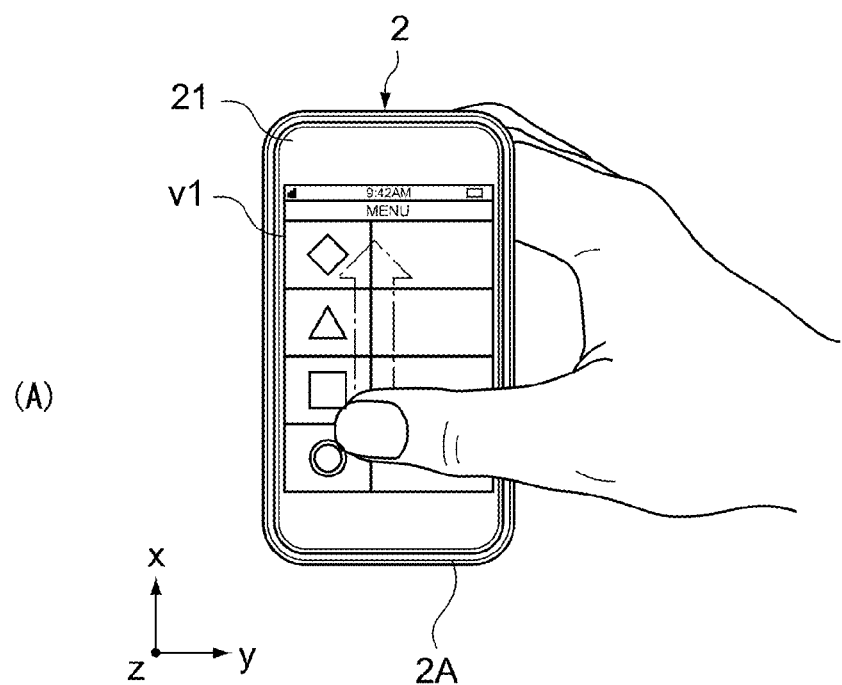
FIG. 5 A diagram explaining a typical operation example of an information display apparatus according to the first embodiment of the present technology, in which (A) shows an input operation surface of the input device, on which the user is performing an input operation, and (B) shows an operation screen presented to the user via the HMD.
Figure 5:
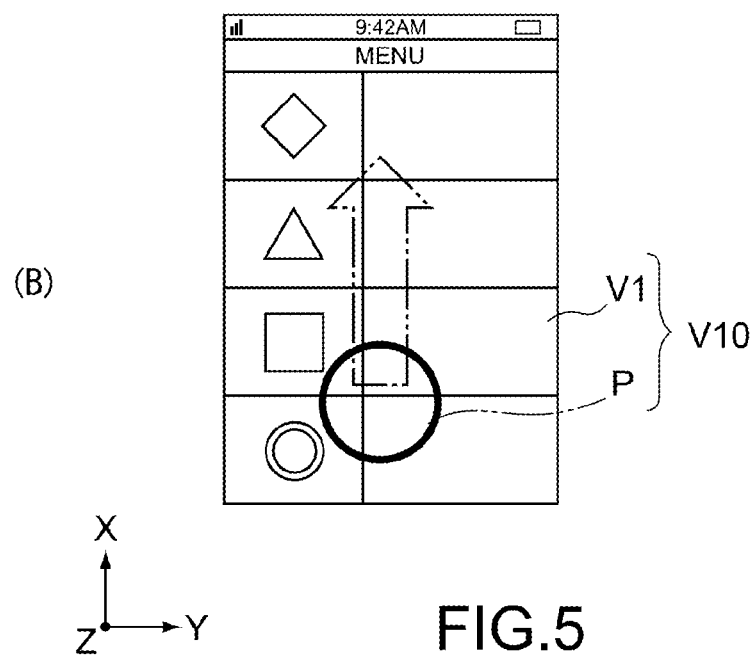

FIG. 4 is a flowchart in an operation example of the HMD 1 (control unit 13) and the input device 2 (control unit 25). FIG. 5 is a diagram explaining a typical operation example of the information display apparatus 100, in which (A) shows the input operation surface 21 of the input device 2, on which the user is performing an input operation, and (B) shows an operation screen presented to the user via the HMD 1. Here, an operation example of the information display apparatus 100 when the user wears the HMD 1 and performs a push-in operation at a predetermined position on the input operation surface 21 of the input device 2. Note that an X-axis direction and a Y-axis direction in the figures correspond to the x-axis direction and the y-axis direction of the input operation surface 21, respectively, and both indicate orthogonal plane directions. The Z-axis direction corresponds to the z-axis direction of the input operation surface 21 and indicates a direction orthogonal to the X-axis direction and the Y-axis direction.

On the input operation surface 21 of the actuated input device 2, for example, an image v1 in which a number of GUIs are displayed is displayed ((A) of FIG. 5). The image v1 is, for example, a menu selection screen of various settings of the HMD 1. Each GUI corresponds to switching to a silent mode of the HMD 1, volume control, increase/reduction of the operation image, change of the display mode of the pointer, or the like. Thus, the input device 2 is configured to be capable of changing the settings of the HMD 1 when the user selects a particular GUI.

At this time, also to the user wearing the HMD 1 connected to the input device 2 and actuated, an image V1 similar to the image v1 is presented in the field-of-view area via the HMD 1.

The input device 2 determines a contact of the finger (detection target) of the user with the input operation surface 21 through the touch sensor 22 (Step ST101). If the contact is detected (YES in Step ST101), the touch sensor 22 outputs the detection signal relating to the xy-coordinate position on the input operation surface 21 with which the finger is in contact, to the control unit 25.

Based on the detection signal, the arithmetic unit 251 of the control unit 25 calculates the xy-coordinate position of the finger on the input operation surface 21 (Step ST102). The signal relating to the xy-coordinate position calculated by the arithmetic unit 251 is output to the transmission/reception unit 27.

The transmission/reception unit 27 transmits the operation signal relating to the xy-coordinate position to the transmission and reception unit 12 of the HMD 1.

Based on the operation signal and the image signal received by the transmission and reception unit 12, the control unit 13 of the HMD 1 generates a signal for controlling an operation image V10 with an auxiliary image (pointer P) indicating a position of the detection target being overlapped on the image V1. The image display element 14, to which this control signal has been output, presents the operation image V10 to the user (Step ST103, (B) of FIG. 5). With this, by the user checking a movement of the pointer P on the operation image V10 presented by the HMD 1 without needing to view the input operation surface 21 at hand, the user can perform a desired operation. Thus, it is possible to perform an intuitive operation of the user. Note that, at this time, the image displayed on the input operation surface 21 may be only the image v1 or may be an image with a pointer or the like being overlapped on the image v1.

Further, when the finger of the user moves while keeping the contact with the input operation surface 21 (see arrows in (A) and (B) of FIG. 5), information on the xy-coordinate position changing over time is acquired by the touch sensor 22. This information is processed as an operation signal by the control unit 25 of the input device 2 and output to the control unit 13 of the HMD 1 via the transmission/reception units 27 and 12. With this, based on the operation signal, the control unit 13 can output a control signal for moving the pointer P to the LCD 141 and move the pointer P in a display area of the image V1 depending on the movement of the finger of the user.

Further, when the finger of the user moves while keeping the contact with the input operation surface 21 (see arrows in (A) and (B) of FIG. 5), information on the xy-coordinate position changing over time is acquired by the touch sensor 22. This information is processed as an operation signal by the control unit 25 of the input device 2 and output to the control unit 13 of the HMD 1 via the transmission/reception units 27 and 12. With this, based on the operation signal, the control unit 13 can output a control signal for moving the pointer P to the LCD 141 and move the pointer P in a display area of the image V1 depending on the movement of the finger of the user.

The control unit 25 determines a contact state between the finger and the input operation surface 21 over time (Step ST105). When the user moves the finger away from the input operation surface 21, the touch sensor 22 outputs a signal when the finger is not in contact. Based on the output of the touch sensor 22, the control unit 25 determines a non-contact between the input operation surface 21 and the finger (YES in Step ST105). In this case, the pointer P disappears from the operation image V10 of the HMD 1 and the image V1 is displayed again.

On the other hand, when the user does not move the finger away from the input operation surface 21, the touch sensor 22 outputs a signal when the finger is in contact. Based on the output of the touch sensor 22, the control unit 25 determines that the finger of the user is in contact with the input operation surface 21 (NO in Step ST105). After that, based on an output of the pressure-sensitive sensor 21, the contact pressure of the finger against the input operation surface 21 is detected (Step ST106).

A selection candidate GUI is selected (determined) by a pushing operation of the user on a display position of the selection candidate GUI. Based on the output of the pressure-sensitive sensor 23, the control unit 25 calculates the contact pressure in the arithmetic unit 251. If the calculated contact pressure is equal to or larger than a predetermined threshold (YES in Step ST106), the control unit 25 determines the selection candidate GUI as a selected GUI and acquires code information corresponding to the selected GUI that is stored in the storage unit 26 (Step ST107).

Otherwise, if the calculated contact pressure is smaller than the predetermined threshold (NO in Step ST106), the control unit 25 determines that the selection candidate GUI had not been selected. In this case, the control unit 25 returns to Step ST105 and repeats the above-mentioned processing.

In addition, the control unit 25 transmits the acquired code information to the HMD 1 via the transmission/reception unit 27 (Step ST108). Based on the code information received via the transmission and reception unit 12, the control unit 13 of the HMD 1 executes processing corresponding to the selected GUI. This processing is, for example, executed based on a program or the like stored in the storage unit 15. For example, even when the function corresponding to the selected GUI is "switching to silent mode," the control unit 13 can switch the settings of the HMD 1 to the silent mode by executing processing based on the code information corresponding to the GUI.

If the code information acquired in Step ST107 is, for example, the volume control, the control unit 13 may also generate an image control signal based on the code information and output it to the image display element 14. With this, for example, a new operation image (not shown) overlapped with a volume control bar or the like is presented to the user wearing the HMD 1. In this case, an image control signal generated by the control unit 13 may also be output from the transmission and reception unit 12 to the input device 2. This makes it possible to display an image similar to the new operation image presented by the HMD 1 also on the input operation surface 21 of the input device 2.

In this embodiment, the input device 2 includes the pressure-sensitive sensor 23. Thus, by the user pushing the finger into the input operation surface 21, it is possible to cause the input device 1 and the HMD 1 to, for example, execute processing corresponding to a desired GUI. With this, for example, even if the input device 2 is placed in a bag, a pocket, or the like, an input operation can also be performed on the input device 2 as it is placed therein. Thus, the convenience can be enhanced. Further, when the contact operation with the input operation surface 21 is combined with the push-in operation, a variety of operations can be performed.

Further, by combining the contact with the input operation surface 21 with the pushing-in and performing the above-mentioned operations, the GUI is not easily selected only by the contact and a false operation can be prevented.

In addition, with the HMD 1, it is possible to perform an operation while viewing an image larger than an image displayed on the input operation surface 21 of the input device 2. Therefore, also for elderly people and the like who have difficulties in viewing a small screen, the use of the portable terminal can be facilitated.

Further, in this embodiment, the image v1 is displayed also on the input operation surface 21 of the input device 2.

With this, the input device 2 is not limited to a device dedicated to the HMD 1 and a portable terminal installing a touch panel display can be connected and used. Thus, in this case, it is possible to use a wide variety of applications of the portable terminal and obtain the above-mentioned actions and effects of the HMD 1.

<Second Embodiment>

Figure 6:
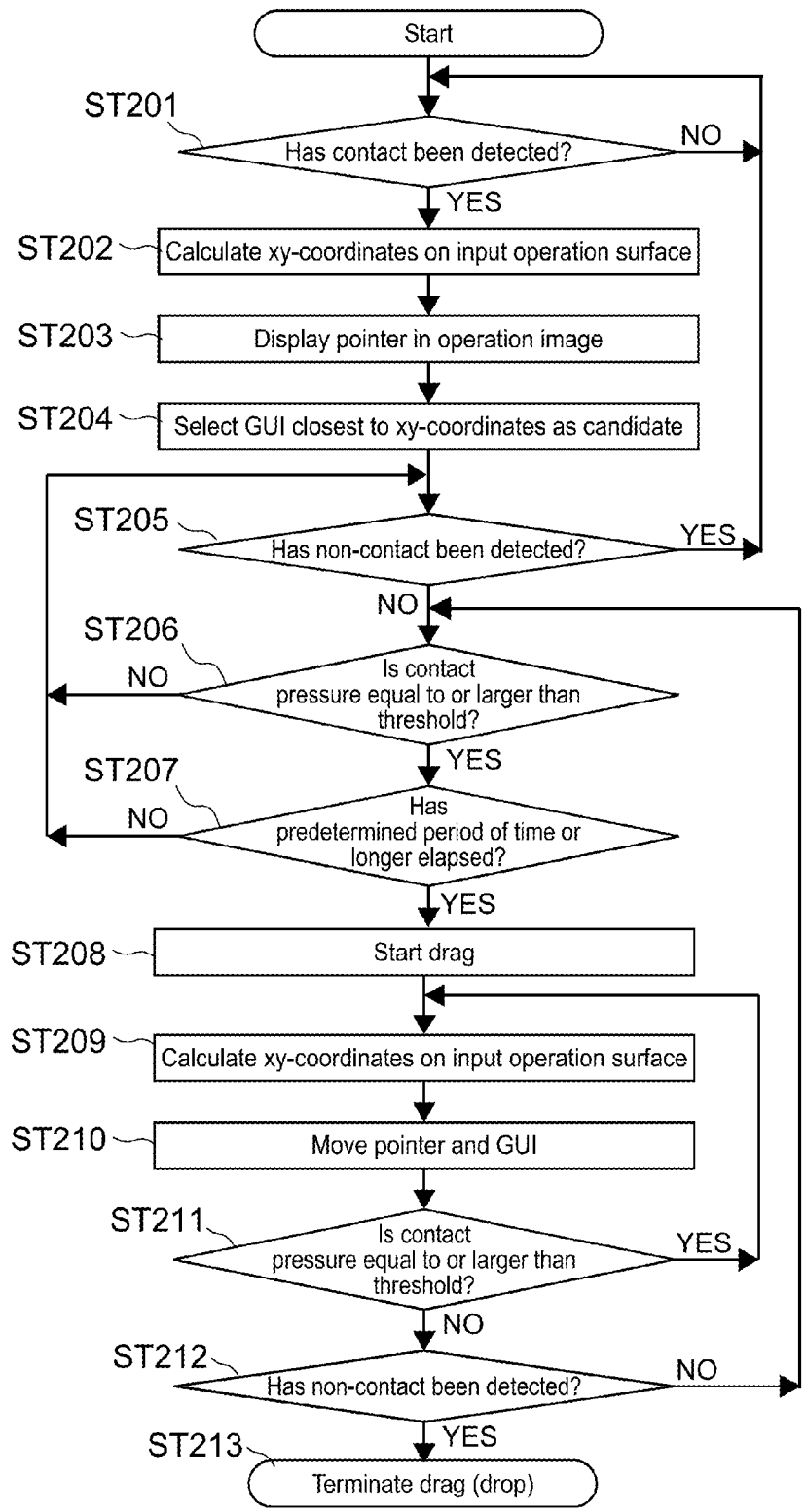
FIG. 6 A flowchart showing an operation example of an information display apparatus according to a second embodiment of the present technology.

FIG. 6 is a flowchart showing an operation example of an information display apparatus according to a second embodiment of the present technology. In this embodiment, descriptions of portions the same as the configurations and actions of the first embodiment will be omitted or simplified and portions different from the first embodiment will be mainly described.

Also in this embodiment, a description will be made provided that the operation image presented by the HMD 1 to the user and the image displayed on the input operation surface 21 are, for example, menu selection images in which a number of GUIs are arranged. A different point from the first embodiment is a point that, in Steps ST207 to 212, the control unit 25 can move the auxiliary image (pointer P) and the selected GUI in the operation image presented to the user to a desired position and change the arrangement of the GUIs, for example. Thus, according to this embodiment, a "drag and drop" operation is possible.

Steps ST201 to 206 in FIG. 6 correspond to Steps ST101 to 106 in FIG. 5, respectively, and hence will be simply described. First, the control unit 25 detects a contact of the finger of the user with the input operation surface 21 (YES in Step ST201) and calculates an xy-coordinate position with which the finger is contact (Step ST202). Based on the xy-coordinate position, the control unit 13 of the HMD 1 displays a pointer P in an image V1 (ST203).

On the other hand, the control unit 25 of the input device 2 selects a GUI closest to the xy-coordinate position as a candidate (Step ST204). The control unit 25 determines a contact state of the finger based on an output of the touch sensor 22 (NO in Step ST205). If determining that the contact pressure in the z-axis direction that is output from the pressure-sensitive sensor 23 is equal to or larger than a threshold (YES in Step ST206), the control unit 25 determines whether or not the contact pressure equal to or larger than the threshold is output for a predetermined period of time or longer (Step ST207).

With the predetermined period of time or shorter (NO in Step ST207), the control unit 25 returns to Step ST206 and repeats the above-mentioned processing.

On the other hand, if the contact pressure is detected for the predetermined period or longer (YES in Step ST207), the control unit 25 determines the selection candidate GUI as a GUI that can be dragged (hereinafter, referred to as draggable GUI) (Step ST208).

The control unit 25 calculates the xy-coordinate position detected from the touch sensor 22 over time depending on a movement of the finger on the input operation surface 21 (Step ST209). In addition, this signal is output to the control unit 13 of the HMD 1 via the transmission/reception unit 27 over time. Based on the change of the xy-coordinate position, the control unit 13 generates an image signal for moving the pointer P and the draggable GUI in an image V10 (Step ST210).

During the movement, the control unit 25 continues to calculate the contact pressure output from the pressure-sensitive sensor 23 over time and determine whether or not the contact pressure is equal to or larger a threshold (YES in Step ST211). If determining that the contact pressure is smaller than the threshold (NO in Step ST211) and further determining a non-contact with the finger (YES in Step ST212), the control unit 25 executes processing of "dropping" the draggable GUI (Step ST213). A position at which the draggable GUI is dropped is a position corresponding to the xy-coordinate position at the point of time when the control unit 25 determines that the contact pressure is smaller than the threshold (NO in Step ST211).

Otherwise, if the control unit 25 does not determine the non-contact (NO in Step ST214), the control unit 25 returns to Step ST206 and determines whether or not the contact pressure output from the pressure-sensitive sensor 23 is equal to or larger than the threshold again.

As described above, with the information display apparatus 100 according to this embodiment, the user can move a GUI, a folder, or the like in the operation image by watching only the operation image of the HMD 1 without needing to check the input operation surface 21 at hand. Thus, due to the outputs of the touch sensor 22 and the pressure-sensitive sensor 23, the "drag and drop" operation can be performed and the operability of the user can be enhanced.

<Third Embodiment>

Figure 7:
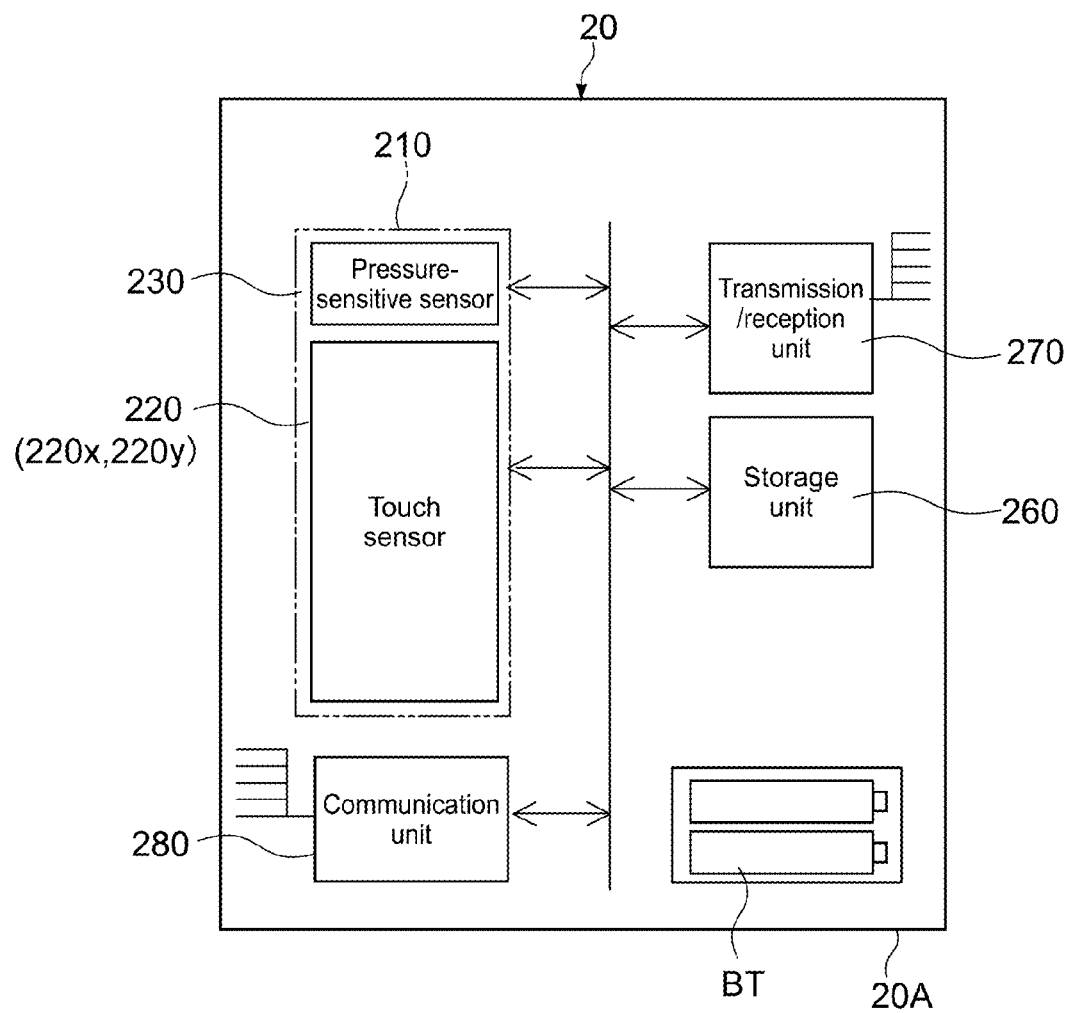
FIG. 7 A block diagram showing an internal configuration of an input device according to a third embodiment of the present technology.
Figure 8:
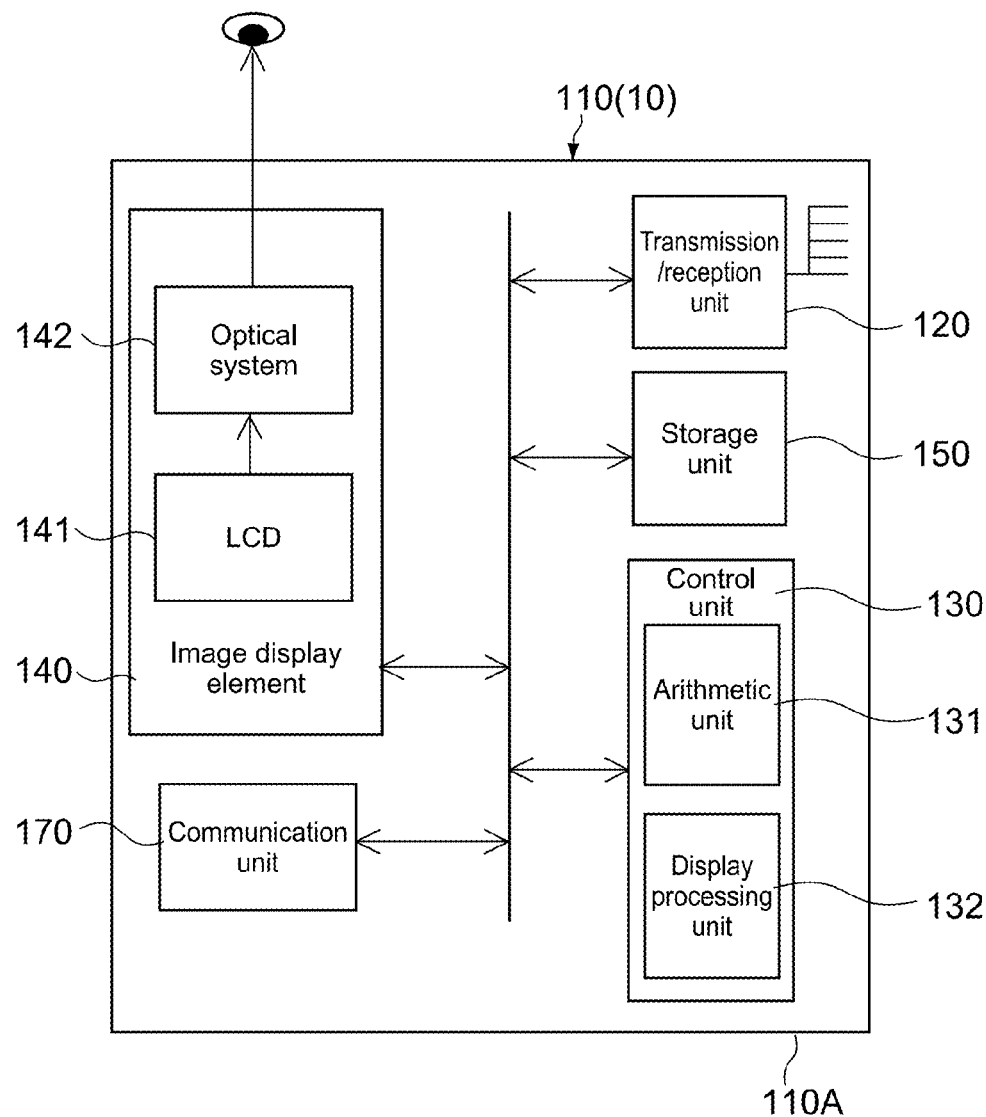
FIG. 8 A block diagram showing an internal configuration of an HMD according to a third embodiment of the present technology.
Figure 9:
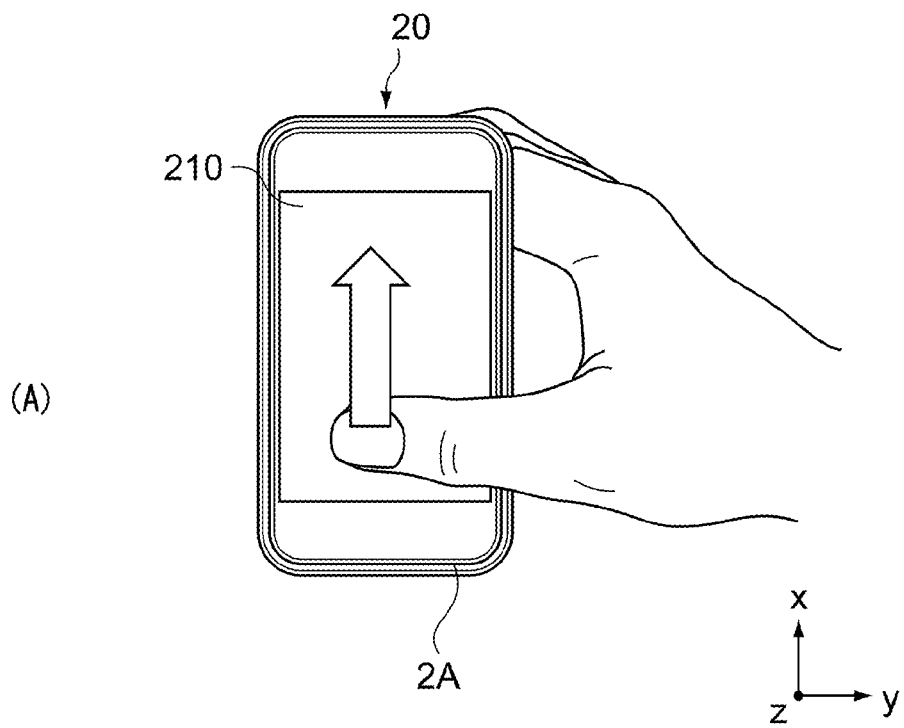
FIG. 9 A diagram explaining a typical operation example of an information display apparatus according to the third embodiment of the present technology, in which (A) shows an input operation surface of an input device, on which the user is performing an input operation, and (B) shows an operation screen presented to the user via the HMD.
Figure 9:
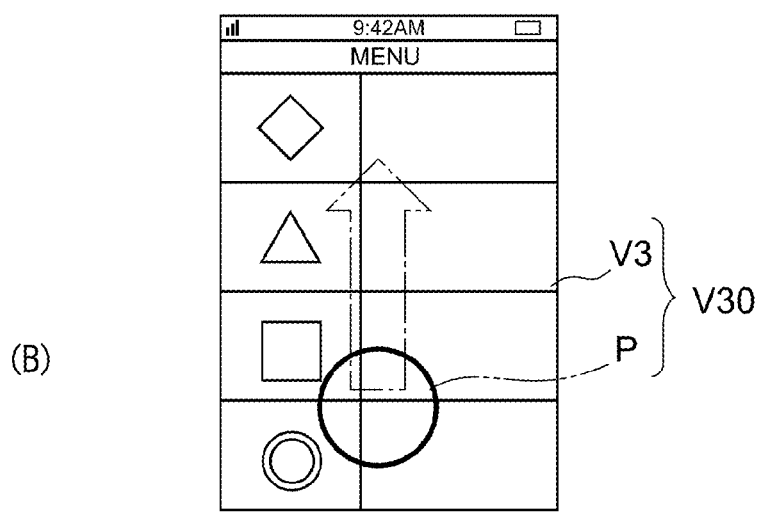

FIGS. 7 to 9 are diagrams explaining a third embodiment of the present technology. FIG. 7 is a block diagram showing an internal configuration of an input device according to this embodiment. FIG. 8 is a block diagram showing an internal configuration of an image display apparatus according to a head-mounted display according to this embodiment. FIG. 9 is a diagram explaining a typical operation example of an information display apparatus, in which (A) shows an input operation surface of the input device, on which the user is performing an input operation, and (B) shows an operation screen presented to the user via the HMD. In this embodiment, descriptions of portions the same as the configurations and actions of the first embodiment will be omitted or simplified and portions different from the first embodiment will be mainly described.

This embodiment is different from the above-mentioned first embodiment in that an input device 20 according to this embodiment does not include a display element and a control unit and an image is not displayed on an input operation surface 210. Specifically, in this configuration, a detection signal of an xy-coordinate position by a touch sensor 220 and a detection signal of a contact pressure by a pressure-sensitive sensor 230 can be transmitted to an HMD 10 via a transmission/reception unit 270 as an operation signal. With this, as shown in (A) of FIG. 9, the image is not displayed on the input operation surface 210 and the input device 20 can be configured to include a so-called touch panel. Thus, the input device 20 according to this embodiment can be a remote controller dedicated to the HMD 10.

In this embodiment, only an input operation by the detection target is performed on the input operation surface 210 of the input device 20. Therefore, the input operation surface 210 can be formed of non-light-transmissive material. With this, in addition to the materials listed in the first embodiment, for example, a synthetic resin or the like that is deformable due to a predetermined contact pressure or higher can be employed.

In this embodiment, a control unit 130 according to an image display apparatus 110 of the HMD 10 includes an arithmetic unit 131 and a display processing unit 132. The arithmetic unit 131 calculates an xy-coordinate position and a contact pressure from the detection signal of the xy-coordinate position by the touch sensor 220 and a detection signal of the contact pressure by the pressure-sensitive sensor 230. Based on a processing result input from the arithmetic unit 131, the display processing unit 132 generates an image signal for forming an image to be displayed by an image display element 140. At this time, the display processing unit 132 may also generate a signal for displaying an auxiliary image such as a pointer at a position of the image on the input operation surface 210, which corresponds to the xy-coordinate position of the detection target. With this, as shown in (B) of FIG. 9, the HMD 10 can display an operation image V30 similar to the operation image V10 according to the first embodiment to the user.

In addition, the image presented by the HMD 10 to the user may also be acquired from the Internet or the like via a communication unit 280 of the input device 20. Alternatively, the HMD 10 may be provided with a communication unit 170 and an image may be generated based on information directly acquired by the HMD 10.

In this embodiment, the configuration of the input device 20 can be simplified. With this, it becomes possible to reduce the size and weight of the input device 20 and to provide the input device 20 that causes less fatigue even in long-term touch operation and is easy to carry.

<Fourth Embodiment>

Figure 10:
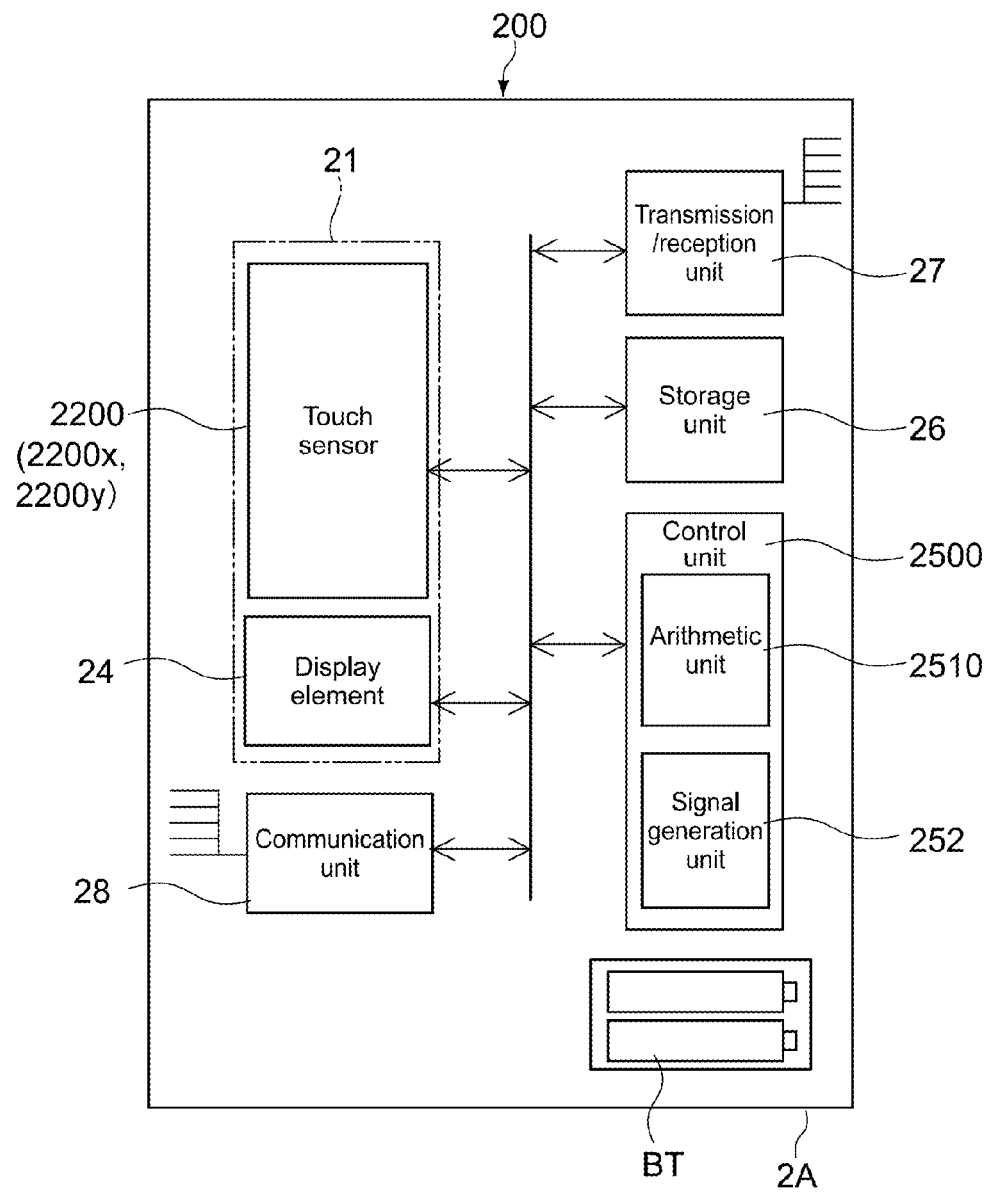
FIG. 10 A block diagram showing an internal configuration of an HMD according to a fourth embodiment of the present technology.

FIG. 10 is a block diagram showing an internal configuration of an input device according to a fourth embodiment of the present technology. In this embodiment, portions the same as the configurations and actions of the first embodiment will be denoted by the same symbols and the descriptions thereof will be omitted or simplified and portions different from the first embodiment will be mainly described.

The embodiment is different from the above-mentioned first embodiment in that an input device 200 according to this embodiment does not include a pressure-sensitive sensor. Thus, in this embodiment, the input device 200 is configured to be capable of detecting a coordinate position corresponding to a movement on an xy-plane of a detection target on the input operation surface 21 through a touch sensor 2200 and detecting a contact pressure. In this embodiment, the touch sensor 2200 constitutes a "sensor unit."

As in the first embodiment, for example, a capacitive touch panel capable of capacitively detecting the detection target in contact with the input operation surface 21 may be used for the touch sensor 2200. The touch sensor 2200 detects a coordinate position corresponding to a movement on the xy-plane of the detection target on the input operation surface 21 and outputs a detection signal corresponding to the coordinate position to a control unit 2500. In addition, for example, when a pushing operation is performed by the detection target at the coordinate position, the touch sensor 2200 detects a capacitance corresponding to the contact pressure of the detection target and an amount of change. With this, the touch sensor 2200 can output a detection signal corresponding to the contact pressure at the coordinate position.

Note that, in addition to the above, for example, a resistive touch panel may also be used. A resistive touch sensor 2200 typically includes two transparent electrodes or the like arranged directly below the input operation surface 21 to be opposed via a predetermined gap. The resistive touch sensor 2200 outputs a voltage (contact resistance) having a magnitude corresponding to the contact pressure of the detection target. With this, the control unit 2500 can calculate the contact pressure of the detection target. Further, in addition to the resistive one, various touch panel sensors such as an infrared type, an ultrasonic type, and a surface acoustic wave type are applicable as the touch sensor according to this embodiment.

Based on an output from the touch sensor 2200, the control unit 2500 is configured to be capable of calculating an xy-coordinate position of the detection target and a contact pressure at this position with the arithmetic unit 2510.

Hereinafter, an operation example of the input device 200 (control unit 2500) will be simply described. Here, as in the operation example described in the first embodiment, an example in which the user selects a particular GUI in the image displayed on the input operation surface 21 and the HMD 1 is shown.

First, the control unit 2500 acquires a detection signal of the xy-coordinate position from the touch sensor 2200. With this, the control unit 2500 determines a GUI or the like closest to the xy-coordinate position as a selection candidate GUI or the like (see Step ST104 in FIG. 4).

Subsequently, with an amount of change of a capacitance output from the touch sensor 2200 being a detection signal of the contact pressure, the control unit 2500 determines whether or not the amount of change is equal to or larger than a predetermined threshold (see Step ST106 in FIG. 4). If it is equal to or larger than the predetermined threshold, as in the first embodiment, processing corresponding to the selected GUI or the like is performed, for example (see Step ST107 in FIG. 4).

On the other hand, with a capacitance value output from the touch sensor 2200 or an amount of change itself being a detection signal of the contact pressure, the control unit 2500 may also be configured to determine whether or not the capacitance value is equal to or larger than a predetermined threshold.

The information display apparatus including the input device 200 having the above-mentioned configuration can contribute to a reduction of the costs and an enhancement of the productivity, or the like and reduce the weight and size of the input device 200.

<Fifth Embodiment>

FIGS. 11 to 14 are diagrams explaining a fourth embodiment of the present technology. In this embodiment, portions the same as the configurations and actions of the first embodiment will be denoted by the same symbols and the descriptions thereof will be omitted or simplified and portions different from the first embodiment will be mainly described.

This embodiment is different from the first embodiment in that a display mode of an auxiliary image (pointer) P4 (P411 to 422) is changed depending on a contact pressure of a detection target (finger) against the input operation surface 21.

Figure 11:
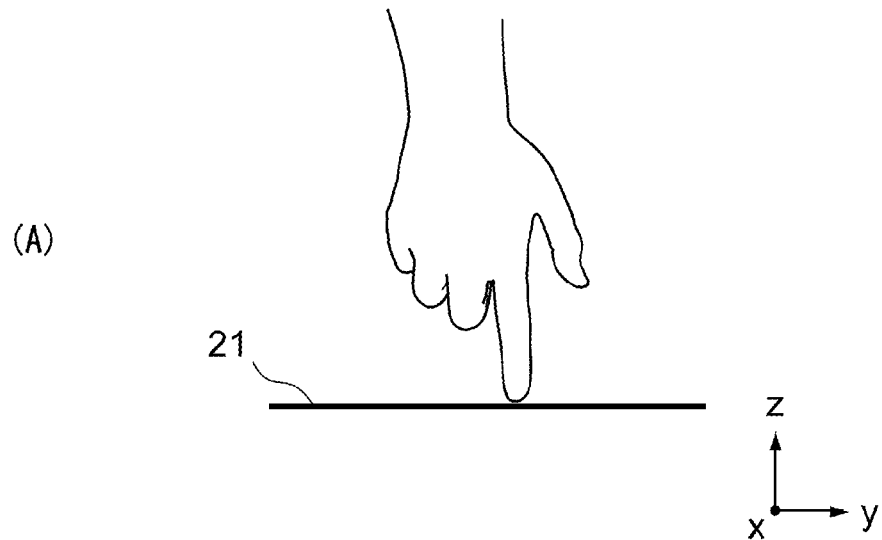
FIG. 11 A diagram showing an example in which an auxiliary image on an image of an HMD becomes larger depending on a contact pressure of a finger in a fifth embodiment of the present technology, in which (A) shows a state in which the finger of the user is in light contact with an input operation surface and (B) shows an operation image of the HMD at this time.
Figure 11:
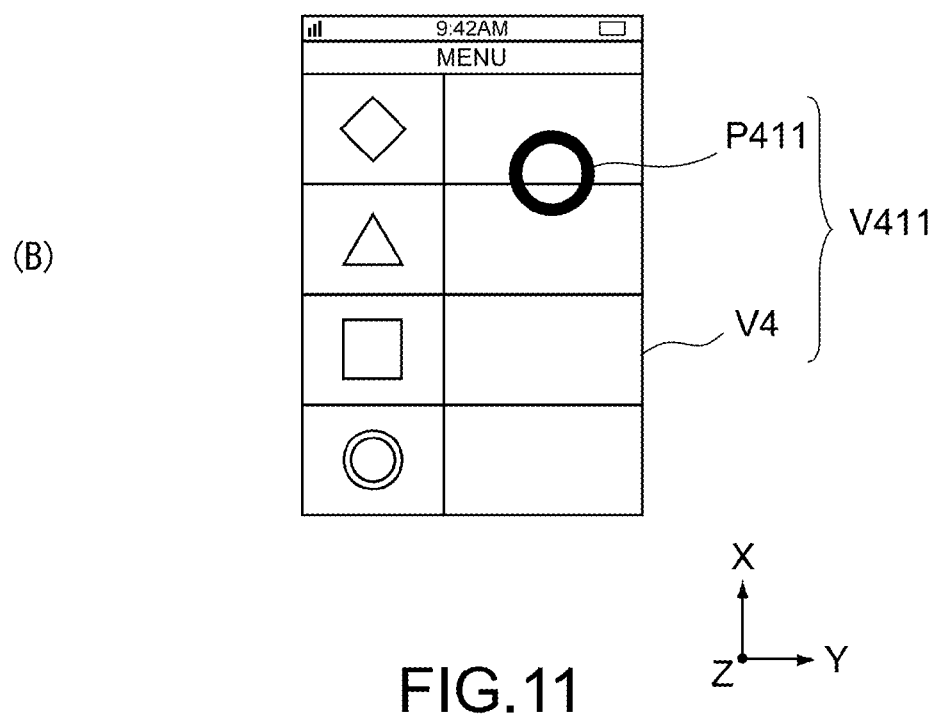
Figure 12:
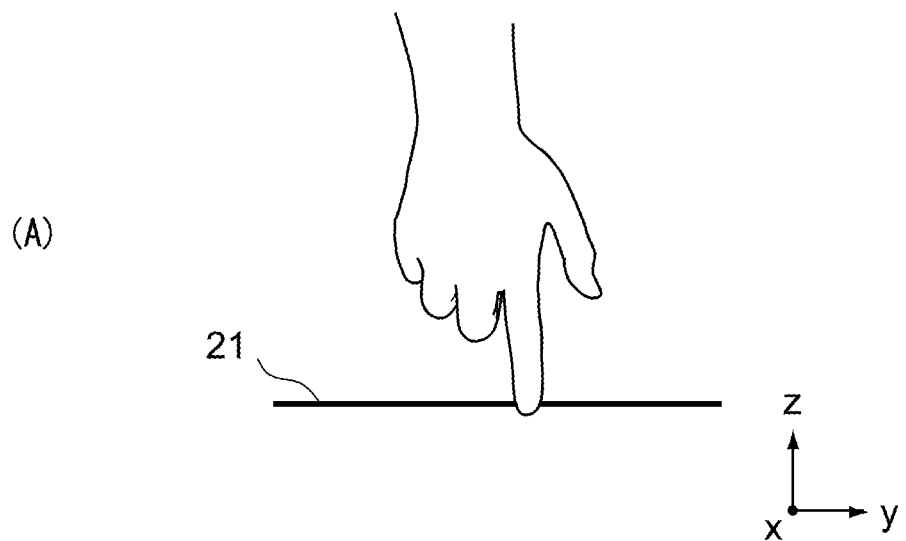
FIG. 12 A diagram showing an example in which the auxiliary image on the image of the HMD becomes larger depending on the contact pressure of the finger in the fifth embodiment of the present technology, in which (A) shows a state in which the finger of the user is pushed into the input operation surface and (B) shows an operation image of the HMD at this time.
Figure 12:
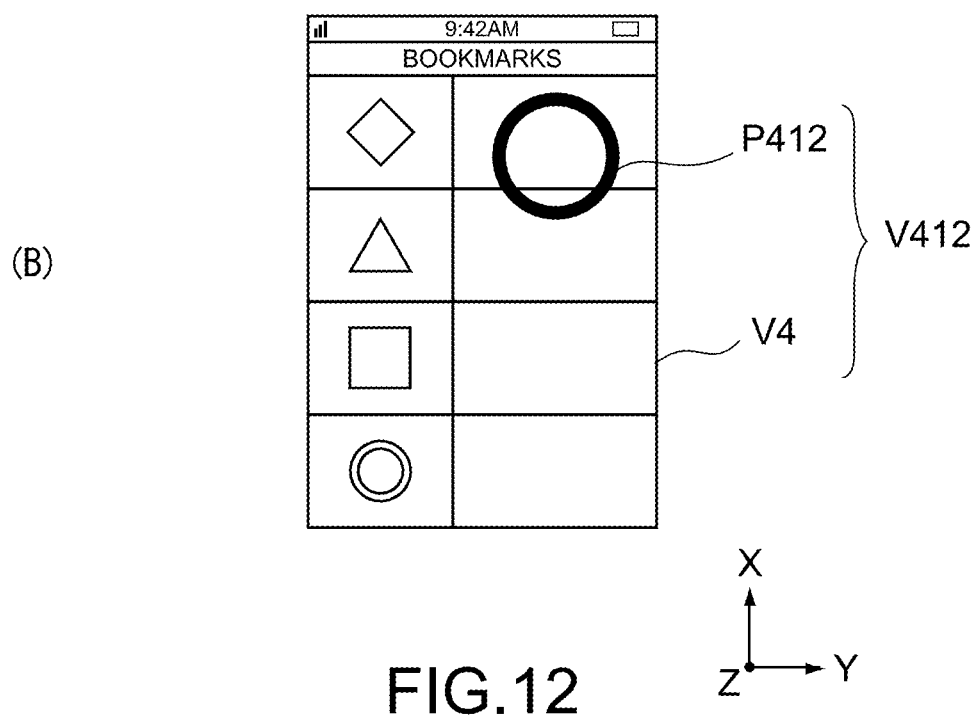

FIGS. 11 and 12 show an example in which an annular pointer P411 on an image V4 becomes larger depending on the contact pressure of the finger. For example, when the finger of the user is in light contact with the input operation surface 21 ((A) of FIG. 11), an operation image V411 overlapped with the pointer P411 with a predetermined size is displayed ((B) of FIG. 11). In addition, when the user pushes the finger into the input operation surface 212 from this state ((A) of FIG. 12), an operation image V412 with a pointer P412 larger than the pointer P411 being overlapped on the image V4 is displayed ((B) of FIG. 12).

Regarding an operation of the information display apparatus 100, for example, when determining that the contact pressure acquired by the pressure-sensitive sensor 23 is equal to or larger than a predetermined threshold, the control unit 25 outputs this information to the control unit 13 of the HMD 1. With this, the control unit 13 generates a control signal for displaying a pointer with a size depending to the contact pressure. As a result, in the operation images V411 and 412, the pointers P411 and P412 with a size depending on the contact pressure are displayed at positions corresponding to contact positions of the finger with the input operation surface 21.

Figure 13:
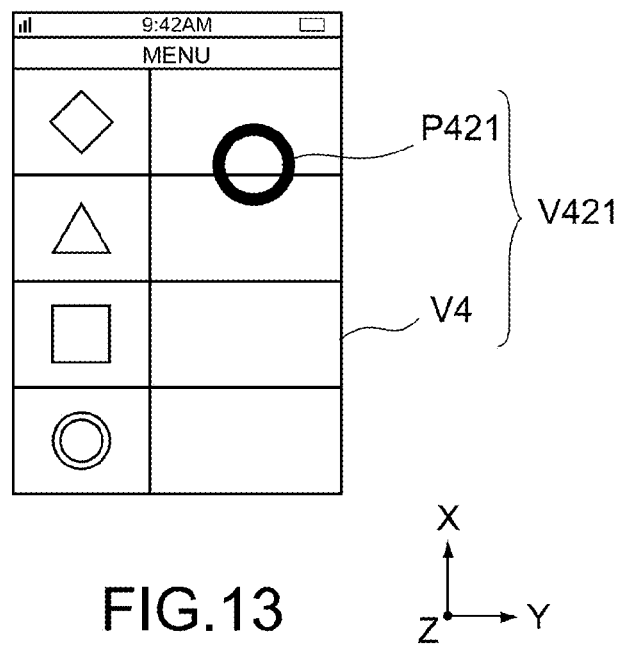
FIG. 13 A diagram showing an example of an operation image according to the fifth embodiment of the present technology, which shows an example in which the color of the auxiliary image on the image of the HMD changes depending on the contact pressure of the finger.
Figure 14:
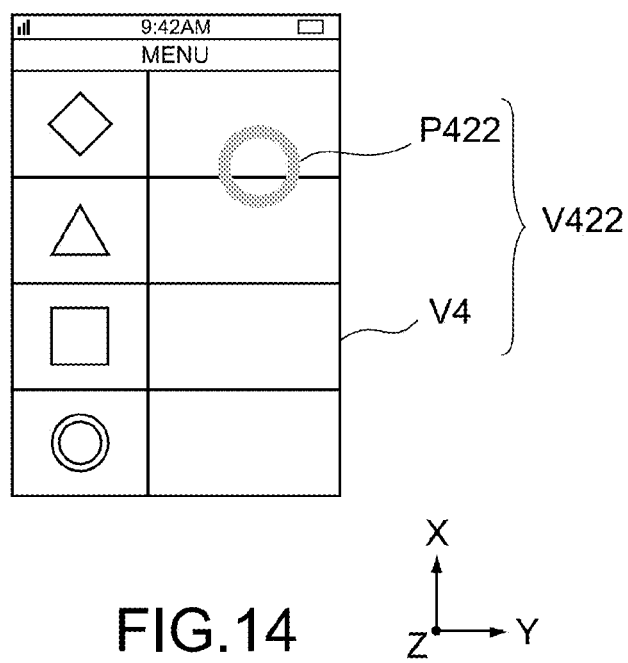
FIG. 14 A diagram showing the example of the operation image according to the fifth embodiment of the present technology, which shows the example in which the color of the auxiliary image on the image of the HMD changes depending on the contact pressure of the finger.

Further, FIGS. 13 and 14 show an example in which the color of annular pointers P421 and P422 on the image V4 is changed depending on the contact pressure of the finger. For example, when the finger of the user is in light contact with the input operation surface 21, the operation image V421 with the black pointer P421 is displayed (FIG. 13). In addition, when the user pushes the finger into the input operation surface 212 from this state, an operation image V422 with the gray pointer P422 being overlapped on the image V4 is displayed (FIG. 14).

Alternatively, a transmittance of the annular pointer P4 on the image V4 may also be configured to change depending on the contact pressure of the finger.

With the information display apparatus 100 as described above, the user can visually check the amount of pushing-in (contact pressure) by himself or herself. This enables the user to more accurately perform an operation combining the contact with the pushing-in by checking the operation image by the HMD 1.

The embodiments of the present technology have been described above. The present technology is not limited thereto and various modifications can be made based on the technical concept of the present technology.

Figure 15:
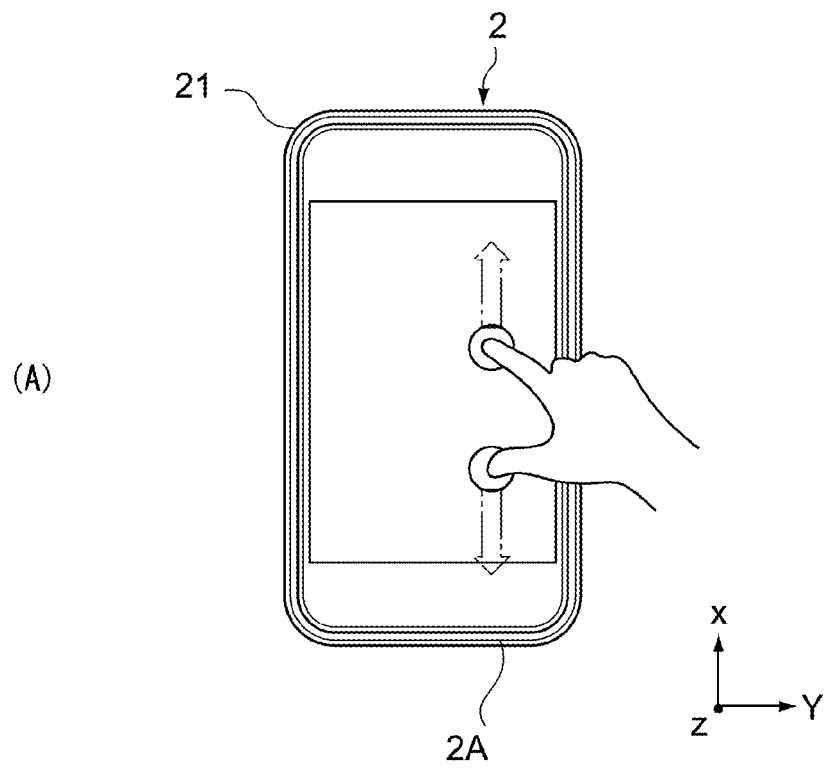
FIG. 15 A diagram showing a modified example of the second embodiment of the present technology, in which (A) shows a state in which the user pushes two fingers into the input operation surface and widens a distance therebetween and (B) shows a state in which an operation image is enlarged at this time.
Figure 15:
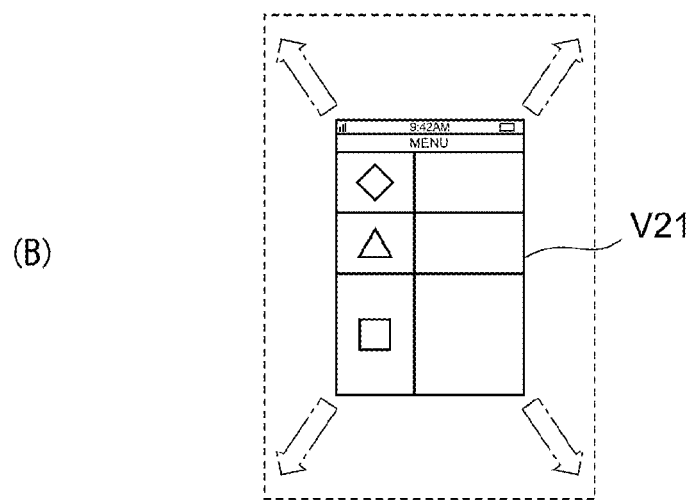
Figure 16:
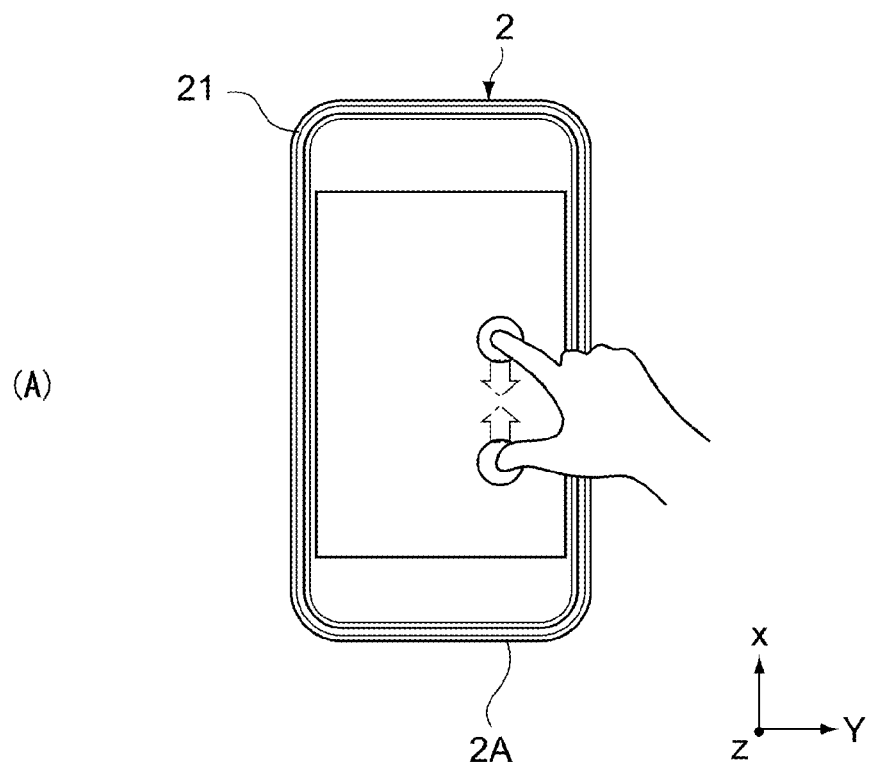
FIG. 16 A diagram showing the modified example of the second embodiment of the present technology, in which (A) shows a state in which the user pushes the two fingers into the input operation surface and shortens the distance therebetween and (B) shows a state in which the operation image is reduced at this time.
Figure 16:
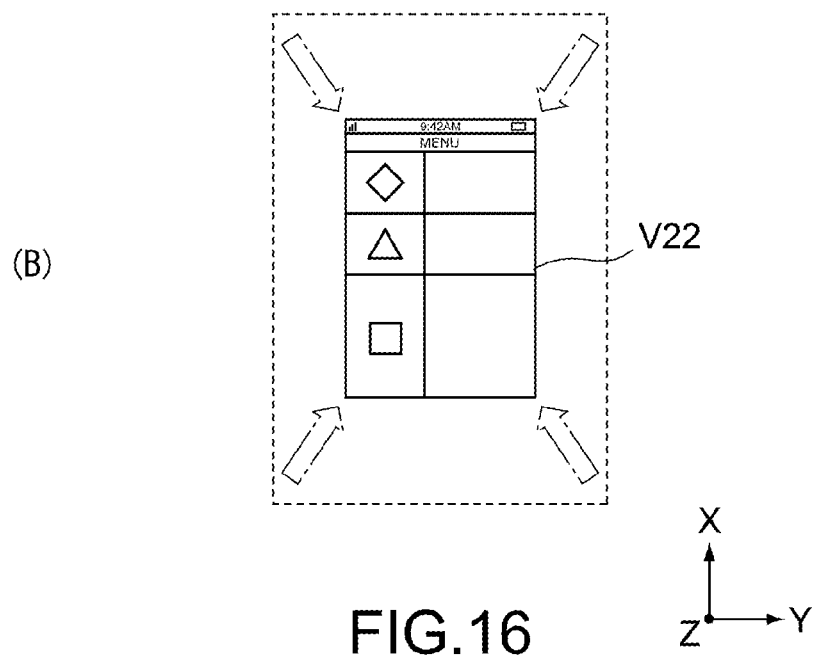

For example, FIGS. 15 and 16 are diagrams explaining a modified example of the second embodiment. The information display apparatus 100 is configured to be capable of detecting two or more contact positions on the input operation surface 21 through the touch sensor 22 and the pressure-sensitive sensor 23 of the input device 2. In addition, by moving these fingers while pushing the fingers into the input operation surface 21, a so-called "pinch/zoom" operation of enlarging or reducing images V21 and 22 can be performed.

For example, if determining that a contact pressure acquired by the pressure-sensitive sensor 23 is equal to or larger than a predetermined threshold, the control unit 25 starts a "pinch/zoom." For example, as shown in (A) of FIG. 15, when the user pushes the two fingers into the input operation surface 21 and widens a distance therebetween, the image V21 can be enlarged depending on the detected distance and change thereof as shown in (B) of FIG. 15. In contrast, as shown in (A) of FIG. 16, when the user pushes the two fingers into the input operation surface 211 shortens the distance therebetween, the image V22 can be reduced depending on the detected distance and change thereof as shown in (B) of FIG. 16.

As described above, according to the modified example, it is possible to change the display area of the image without needing to view the input operation surface 21. This makes it easy to enlarge the display area, for example, when the image V21 is too small to see. In addition, in wishing to watch the outside world, it also becomes possible to more easily view the outside world by reducing the image V22. Thus, it is possible to provide the information display apparatus 100 easier for the user to use even in long-term mounting.

Further, by the same "pinch/zoom" operation, not only the enlargement and reduction of the display area but also enlargement and reduction of a part of the image (e.g., particular command) can be performed.

For example, as a modified example of the first embodiment, it is also possible to form an operation image changed in luminance, intensity, or the like of an area corresponding to a position of the finger on the input operation surface 21. In this case, the "auxiliary image" can be an image of the area changed in luminance, intensity, or the like.

A specific operation example of the information display apparatus 100 according to the above-mentioned modified example will be described. For example, based on a detection signal from the touch sensor 22, the control unit 25 calculates an xy-coordinate position of the finger on the input operation surface 21 and outputs this information to the control unit 13 of the HMD 1. Based on the information, the control unit 13 generates a control signal for changing the luminance or intensity of the corresponding XY-coordinate position.

With this, the HMD 1 can present to the user an operation image different in luminance, intensity, or the like between the area corresponding to the contact position of the finger and the other area. Thus, also according to the modified example, the user can check the contact position of the finger or the like on the input operation surface by viewing the operation image displayed by the HMD 1.

For example, in the above-mentioned embodiments, the input device is the portable terminal or the like held and used by the user. However, it is not limited thereto. For example, it may be a wrist-watch type attached to the wrist of the user or may be a wrist band type attached to the arm of the user. Alternatively, it may be in a form attached or adhering to clothes. In this manner, in the present technology, as long as it is a device that enables the detection target to be in contact with the input operation surface, any type of input device may be used.

Further, in the above-mentioned embodiments, the see-through HMD is used. However, it is not limited thereto. A non-see-through HMD may also be used. Also in this case, the user can perform an intuitive operation without needing to view the input operation surface of the input device by performing an operation while viewing an image presented by the HMD.

An imaging element may be installed into the HMD and configured to be capable of imaging the outside world. This enables the HMD and the input device to display the captured image, for example.

In the embodiments, an example in which the shape of the pointer is annular has been described. However, it is needless to say that it is not limited thereto. For example, it is possible to employ any shape, for example, an arrow, a triangle, a square, and a circle.

Note that the present technology may also take the following configurations.

(1) A head-mounted display, including:
a reception unit that receives an operation signal including information on a relative position of a detection target in contact with an input operation surface, which is output from an input device;
an image display element that forms an image presented to a user; and
a display processing unit that causes, based on the operation signal, the image display element to display an operation image with an auxiliary image indicating a position of the detection target being overlapped on the image.

(2) The head-mounted display according to (1), in which
the reception unit further receives an image signal output from the input device, and
the display processing unit causes, based on the image signal, the image display element to display the image.

(3) The head-mounted display according to (1) or (2), in which the display processing unit moves, based on the operation signal, the auxiliary image in a display area of the image.
(4) The head-mounted display according to any one of (1) to (3), in which
the operation signal includes information on a contact pressure of the detection target against the input operation surface, and
the display processing unit changes a display mode of the auxiliary image depending on the contact pressure of the detection target against the input operation surface.
(5) The head-mounted display according to (3) or (4), further including
an arithmetic unit that calculates, based on the operation signal, a coordinate position of the detection target on the input operation surface, in which
the display processing unit causes, based on a coordinate position of the detection target calculated by the arithmetic unit, the image display element to display the operation image.
(6) An information display apparatus, including:
an input device including
an input operation surface, and
a sensor unit that detects a contact of a detection target with the input operation surface and outputs information on a coordinate position of the detection target on the input operation surface; and
a head-mounted display including
an image display element that forms an image presented to a user, and
a display processing unit that causes, based on an output of the sensor unit, the image display element to form an operation image with an auxiliary image indicating a position of the detection target being overlapped on the image.
(7) The information display apparatus according to (6), in which
the input device further includes
a display element that displays an image on the input operation surface, and
the head-mounted display displays an image with the auxiliary image being overlapped on an image displayed on the input operation surface, as the operation image.
(8) The information display apparatus according to (6) to (7), in which
the sensor unit detects a contact pressure added by the detection target to the input operation surface.
(9) The information display apparatus according to (8), in which
the head-mounted display changes a display mode of the auxiliary image depending on the contact pressure of the detection target from the operation surface.
(10) The information display apparatus according to any one of (6) to (9), in which
the sensor unit detects a movement of the detection target on the input operation surface, and
the head-mounted display displays the auxiliary image moving depending on the detected movement of the detection target.
(11) An information display apparatus, including:
an input device including
an input operation surface, and
a sensor unit that detects a contact of the detection target with the input operation surface; and
a head-mounted display including
an image display element that forms an image presented to a user, an arithmetic unit that calculates, based on an output of the sensor unit, a coordinate position of the detection target on the input operation surface, and
a display processing unit that causes, based on a coordinate position of the detection target calculated by the arithmetic unit, the image display element to form an operation image with an auxiliary image indicating a position of the detection target being overlapped on the image.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

DESCRIPTION OF SYMBOLS

1 HMD (head-mounted display)
2, 20 input device
12, 120 transmission/reception unit (reception unit)
13 control unit (display processing unit)
131 arithmetic unit
132 display processing unit
14, 140 image display element
21, 210 input operation surface
22, 220 touch sensor (sensor unit)
23, 230 pressure-sensitive sensor (sensor unit)
24 display element
100 information display apparatus
P, P411, P412, P421, P422 pointer (auxiliary image)
V10, V30, V411, V412, V421, V422 operation image

The invention claimed is:
1. A head-mounted display, comprising:
a reception and transmission unit configured to
receive a first operation signal including information on a relative position of a detection target in contact with an input operation surface, which is output from an input device,
receive an image signal output from the input device, and
receive code information indicating that the relative position of the detection target is within a target area of the input device;
a head-mounted image display element configured to form an image presented to a user; and
a display processing unit configured to
cause, based on the received first operation signal, the head-mounted image display element to display a first operation image with an auxiliary image indicating a position of the detection target being overlapped on the image, and
cause, based on the image signal, the image display element to display the image,
wherein the first operation signal includes information on a contact pressure of the detection target against the input operation surface,
wherein the display processing unit is configured to execute display processing on the image display element if the contact pressure of the detection target against the input operation surface in the target area of the input operation surface exceeds a threshold pressure amount, and if the code information indicates that the detection target is within the target area, the display processing including displaying a second operation image associated with the target area and being overlapped on the image, and wherein the reception and transmission unit is further configured to transmit a second operation signal to the input device that causes the second operation image to be displayed on an input device image display element.

2. The head-mounted display according to claim 1, wherein the display processing unit is configured to move, based on the operation signal, the auxiliary image in a display area of the image.

3. The head-mounted display according to claim 1, wherein the display processing unit is configured to change a display mode of the auxiliary image depending on the contact pressure of the detection target against the input operation surface.

4. The head-mounted display according to claim 1, further comprising an arithmetic unit configured to calculate, based on the operation signal, a coordinate position of the detection target on the input operation surface, wherein the display processing unit is configured to cause, based on a coordinate position of the detection target calculated by the arithmetic unit, the image display element to display the first operation image.

5. The head-mounted display according to claim 1, wherein the display processing unit is configured to enable a change of position of a GUI image associated with the target area if the contact pressure of the detection target against the input operation surface exceeds the threshold pressure amount for at least a predetermined amount of time.

6. An information display apparatus, comprising:
an input device including
an input operation surface,
a sensor unit configured to detect a contact of a detection target with the input operation surface and configured to output information on a coordinate position of the detection target on the input operation surface, and
an input device image display element; and
a head-mounted display including
a reception and transmission unit configured to
receive a first operation signal including the information which is output from the input device, and
receive an image signal output from the input device, and
receive code information indicating that the coordinate position of the detection target is within a target area of the input device;
a head-mounted image display element configured to form an image presented to a user, and
a display processing unit configured to
cause, based on a received output of the sensor unit, the head-mounted image display element to form a first operation image with an auxiliary image indicating a position of the detection target being overlapped on the image, and cause, based on the image signal, the image display element to display the image,
wherein the first operation signal includes information on a contact pressure of the detection target against the input operation surface detected by the sensor unit,
wherein the display processing unit is configured to execute display processing on the image display element if the contact pressure of the detection target against the input operation surface in the target area of the input operation surface exceeds a threshold pressure amount, and if the code information indicates that the detection target is within the target area, the display processing including displaying a second operation image associated with the target area and being overlapped on the image, and wherein the reception and transmission unit is further configured to transmit a second operation signal to the input device that causes the second operation image to be displayed on an input device image display element.

7. The information display apparatus according to claim 6, wherein the head-mounted display is configured to display the image with the auxiliary image being overlapped on the image displayed on the input operation surface, as the first operation image.

8. The information display apparatus according to claim 6, wherein the sensor unit is configured to detect a movement of the detection target on the input operation surface, and the head-mounted display is configured to display the auxiliary image moving depending on the detected movement of the detection target.

9. An information display apparatus, comprising:
an input device including
an input operation surface,
a sensor unit configured to detect a contact of a detection target with the input operation surface and configured to output information on a coordinate position of the detection target on the input operation surface, and
an input device image display element; and
a head-mounted display including
a reception and transmission unit configured to
receive a first operation signal including information on a relative position of the detection target in contact with the input operation surface, which is output from the input device, and
receive an image signal output from the input device, and
receive code information indicating that the coordinate position of the detection target is within a target area of the input device; and
a head-mounted image display element configured to form an image presented to a user,
an arithmetic unit configured to calculate, based on an output of the sensor unit, a coordinate position of the detection target on the input operation surface, and
a display processing unit configured to
cause, based on a received coordinate position of the detection target calculated by the arithmetic unit, the head-mounted image display element to form a first operation image with an auxiliary image indicating a position of the detection target being overlapped on the image, and
cause, based on the image signal, the image display element to display the image,
wherein the first operation signal includes information on a contact pressure of the detection target against the input operation surface detected by the sensor unit,
wherein the display processing unit is configured to execute display processing on the image display element if the contact pressure of the detection target against the input operation surface in the target area of the input operation surface exceeds a threshold pressure amount, and if the code information indicates that the detection target is within the target area, the display processing including displaying a second operation image associated with the target area and being overlapped on the image, and wherein the reception and transmission unit is further configured to transmit a second operation signal to the input device that causes the second operation image to be displayed on an input device image display element.

\* \* \* \* \*